United States Patent [19]
Kojima et al.

[11] Patent Number: 5,192,859
[45] Date of Patent: Mar. 9, 1993

[54] CARD CARRIER IN CARD READER

[75] Inventors: Susumu Kojima; Masanori Tanaka, both of Sakado, Japan

[73] Assignee: Kabushiki Kaisha Nippon Conlux, Tokyo, Japan

[21] Appl. No.: 797,152

[22] Filed: Nov. 26, 1991

Related U.S. Application Data

[63] Continuation of Ser. No. 382,950, Jul. 21, 1989, abandoned.

[30] Foreign Application Priority Data

| Jul. 26, 1988 | [JP] | Japan | 63-98695 |
| Jul. 26, 1988 | [JP] | Japan | 63-98696 |
| Jul. 26, 1988 | [JP] | Japan | 63-98697 |
| Jul. 26, 1988 | [JP] | Japan | 63-98698 |
| May 22, 1989 | [JP] | Japan | 1-58825 |
| May 22, 1989 | [JP] | Japan | 1-58826 |

[51] Int. Cl.$^5$ .................. G06K 13/077; G06K 13/30
[52] U.S. Cl. .................. 235/481; 235/437; 235/478; 235/480; 235/487
[58] Field of Search .......... 235/437, 478, 480, 481, 235/487; 902/12; 360/2

[56] References Cited

U.S. PATENT DOCUMENTS

| 3,735,095 | 5/1973 | Mutz et al. | 235/480 |
| 3,798,422 | 3/1974 | Foret et al. | 235/478 |
| 3,940,796 | 2/1976 | Haun | 235/482 |
| 3,943,336 | 3/1976 | Dillard | 235/437 |
| 4,779,145 | 10/1988 | Lemelson | 235/487 |
| 4,847,475 | 7/1989 | Watabe et al. | |
| 4,950,877 | 8/1990 | Kurihara | 235/480 |

FOREIGN PATENT DOCUMENTS

| 11489 | 2/1976 | Japan . |
| 18183 | 9/1976 | Japan . |
| 1925 | 1/1978 | Japan . |
| 14210 | 5/1978 | Japan . |
| 27408 | 2/1980 | Japan . |
| 22581 | 5/1980 | Japan . |
| 22615 | 6/1980 | Japan . |

Primary Examiner—Harold Pitts
Attorney, Agent, or Firm—Diller, Ramik & Wight

[57] ABSTRACT

A card carrier including pairs of rollers disposed at predetermined spacings along a card conveyer passageway such that the respective pairs of rollers hold both sides of a card therebetween. A driver including a single motor, a power transmission including a plurality of timing pulleys and a plurality of timing belts for transmitting the drive force of the motor to all the rollers, and power interrupting means including a clutch mechanism disposed between the power transmission and the motor for transmitting the drive force of the motor to the power transmission when the motor arrives at a predetermined rated rotational speed and a brake mechanism for stopping the operation of the power transmission instantaneously. When the motor arrives at the rated rotational speed, the clutch mechanism is actuated to drive all the rollers. When the card is to be stopped at a predetermined position, the drive force of all the rollers is stopped instantaneously by the clutch mechanism and the brake mechanism.

19 Claims, 32 Drawing Sheets

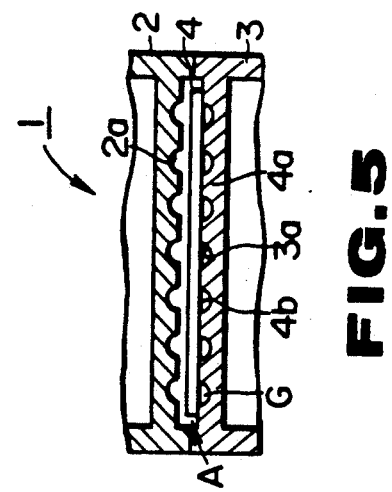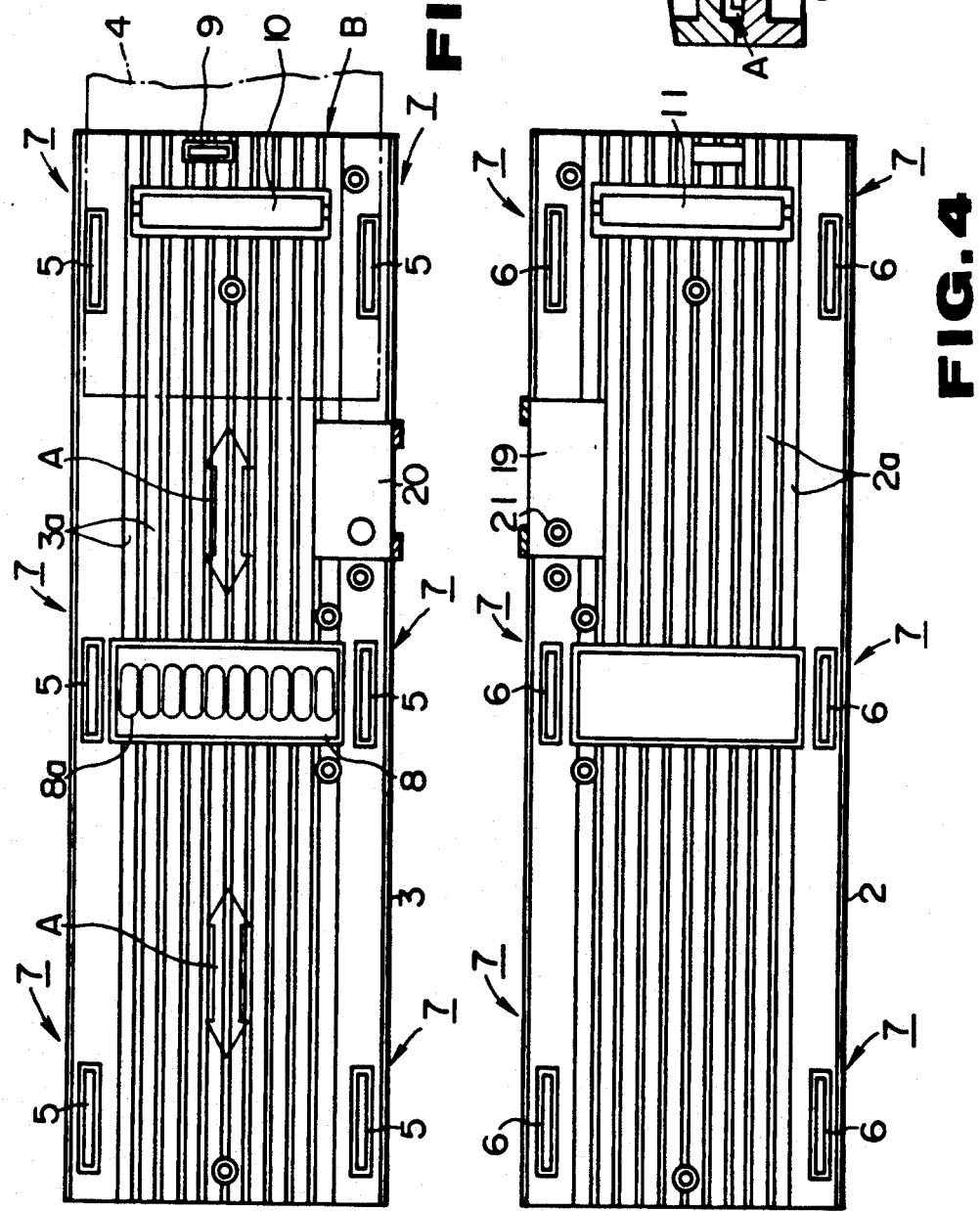

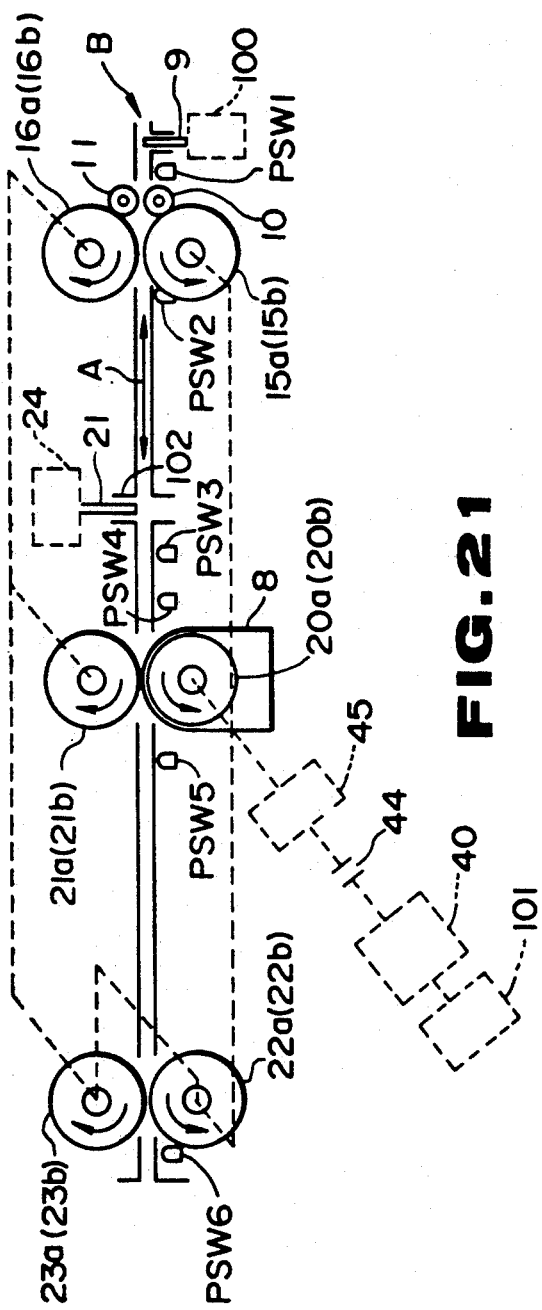
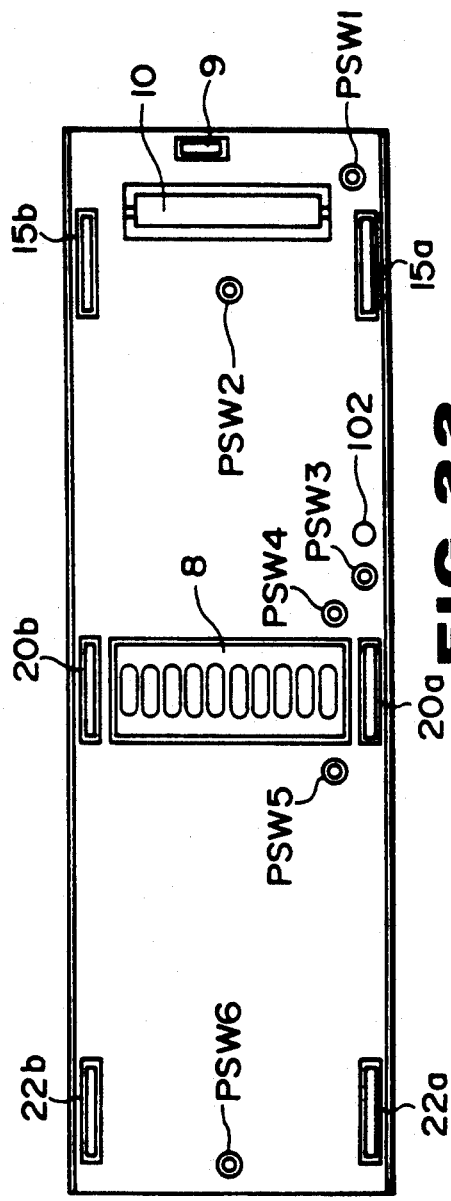

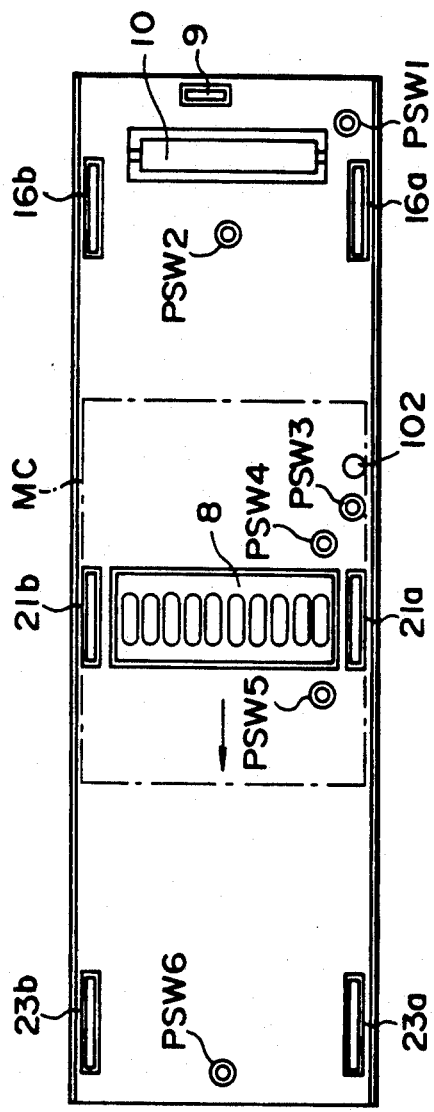
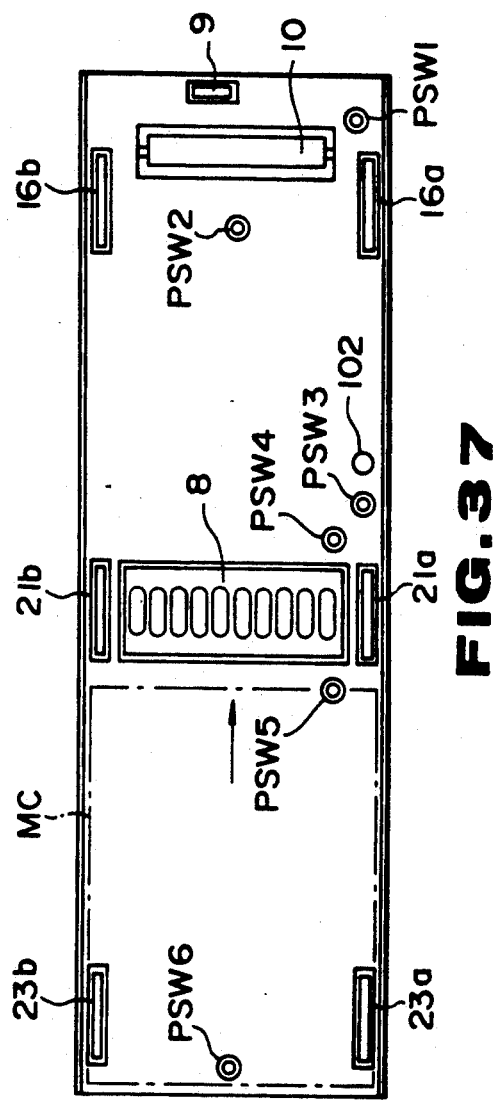

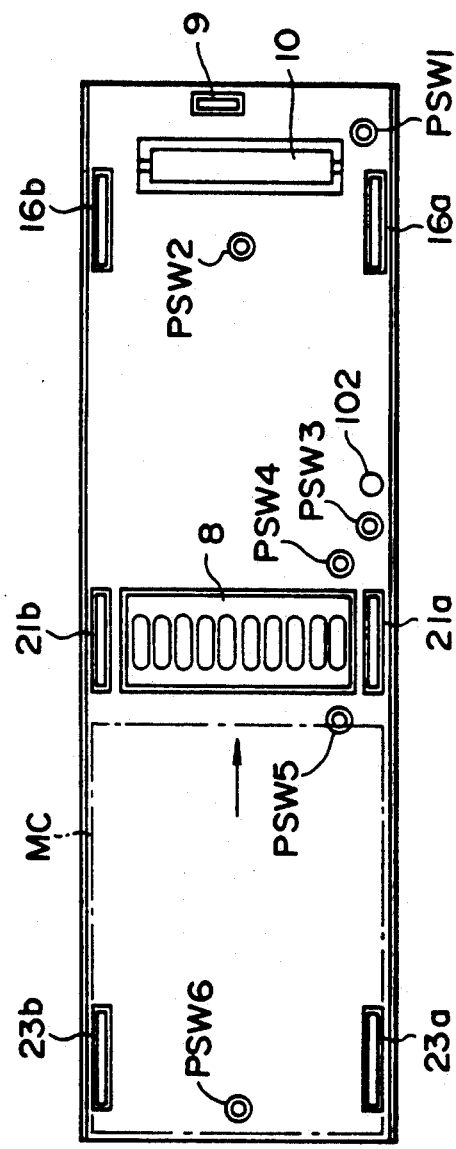
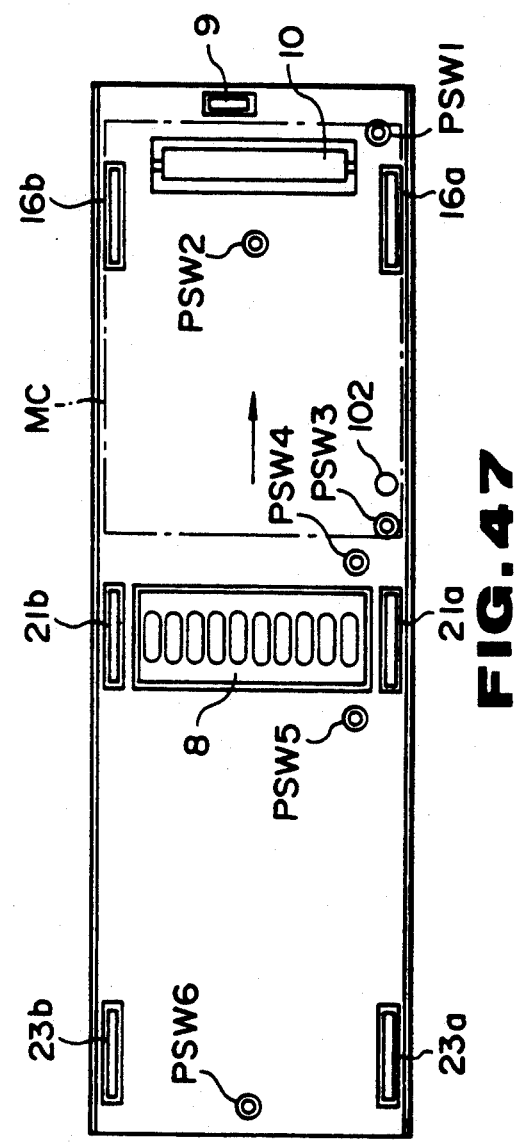
FIG. 46
FIG. 47

CARD CARRIER IN CARD READER

This application is a continuation of application Ser. No. 07/382,950, filed Jul. 21, 1989, now abandoned.

BACKGROUND OF THE INVENTION

This invention relates to a card reader carrying out processings, e.g., reading information stored in a magnetic card or writing information into the magnetic card, and more particularly to a card carrier in the card reader carrying the magnetic card in order to write and read the information.

Generally, a card reader is used in order to read information stored in a magnetic card, to write information into the card, to check the information written into the card and to form a punched hole (especially, a hole allowing a visual check of data on the remaining sum of money recorded magnetically on a prepaid card which records the information on a certain sum of money when the card is used as an article-exchange ticket, passenger ticket or telephone coupon ticket) visually transmitting to the user the magnetically recorded information.

Conventionally, in accordance with such card reader, a card carrier including a plurality of carrying belts made of an elastic material and a like of motors driving the plurality of the carrying belts are employed and the plurality of the carrying belts made of the elastic material causes the card inserted through a card insertion slot to travel over a magnetic sensor, in order to carry out various processings, e.g., write and read the information.

Generally, the card carrier in the card reader must bring the card into close contact with the magnetic sensor when information stored in the card is read. Therefore, in a conventional card carrier, a pressure roller made of an elastic material is brought into close contact with the magnetic sensor by the force of a resilient means, e.g., of a spring. Once the travelling card reaches the magnetic sensor, the card lifts up the pressure roller provided atop the magnetic sensor in order to pass between the pressure roller and the magnetic sensor.

In addition, the prior-art card carrier in the above card reader includes a flat card-passageway over which the card travels.

Since the above prior-art card carrier in the card reader has an arrangement in which the plurality of carrying belts carries the card and the like plurality of motors drives the carrying belts, the card travel speed is irregular until the speed of each motor reaches a predetermined rotation speed from the start of that motor over the card passageway, and the inertia of each motor or the carrying mechanism does not causes the card to stop at a predetermined location, so that the position of a punched hole made in the card varies from hole to hole and hence the card cannot visually transmit to the card user accurate magnetically-recorded information (e.g., on the frequency of use of the card).

In addition, since the prior-art card carrier includes an arrangement in which the carrying belts are brought into direct contact with a magnetic data line of the card, the magnetic-data-side surface of the card tends to easily experience damages, e.g., a stain and abrasion, so that reading from and writing into the card become impossible.

In addition, the above prior-art card carrier includes an arrangement in which the pressure roller is in close contact with the magnetic sensor, the conveyance force of the travelling card elevates the pressure roller to pass the card into a space between the pressure roller and the magnetic sensor to bring the card into close contact with the magnetic sensor. Therefore, the front end of the travelling card collides with the pressure roller when the front end of the card elevates the pressure roller, so that a mechanical shock due to that collision causes a jamming of the card on the surface of the magnetic sensor, or the mechanical shock due to said instantaneous collision causes the pressure roller to jump, so that the close contact of the front end of the card with the magnetic card would be broken, and reading and writing data would be impossible during this process.

In the conventional card conveyer mentioned above, the card conveyer passageway is formed as a flat one, so that sand or dust depositing on the card inserted in the card conveyor passageway or dust or the like entering externally into the card conveyer passageway would deposit on substantially the entire area of the card conveyer passageway, so that if a newly inserted card moves along the card passageway, dust or the like contacts the magnetic recording face of the card to thereby produce scratches on the magnetic recording face. If scratches are produced on an area other than the magnetic data line on the card closely contacting the magnetic head of the magnetic sensor, there are few problems. However, if such a scratch is formed on the magnetic data line on the card closely contacting the magnetic head, the magnetic head cannot read data written onto the card, which is a serious problem.

In the conventional card conveyer, when a card is inserted into a card insertion slot, it is immediately gripped between belts of belt-type card conveyer means including the plurality of elastic conveyer belts to thereby travel along the card conveyer passage. As mentioned above, the conveyer belts are made of a deformable elastic material such as rubber, so that even if a card different in thickness from a usable card, namely, an unusable thicker false card, is inserted into the card insertion slot, it is impossible to stop the insertion of the false card. Therefore, in the conventional card carrier, both the usable genuine card of an acceptable thickness and the unusable false card of an unacceptable thicknesses would be received temporarily, then only the unusable thicker false card would be determined to be a false one by a card validator disposed in the card reader and discharged from the card conveyer passageway, so that, disadvantageously, it takes much time for validation of a card according to thickness.

SUMMARY OF THE INVENTION

It is a first object of the present invention to provide a card carrier which carries a card at a constant speed along a card conveyer passageway, instantaneously stops the card at a constant dimensional position surely and prevents damage to the card recording face as much as possible.

It is a second object of the present invention to provide a card carrier which prevents jamming of a card, and erroneous reading and writing of data on and into the card as much as possible.

It is a third object of the present invention to provide a card carrier which damages no magnetic line on the magnetic card.

It is a fourth object of the present invention to provide a card carrier in a card reader which validates a card rapidly.

In order to achieve the first object, a card carrier according to the present invention includes card conveyer means including pairs of rollers disposed at predetermined spacings disposed along the card conveyer passageway such that the respective pairs of rollers hold both sides of the card therebetween; drive means including a single motor; power transmission means including a timing pulley and a timing belt for transmitting the drive force of the motor to all the rollers; a clutch mechanism disposed between the power transmission means and the motor for transmitting the drive force of the motor to the power transmission means when the motor arrives at a predetermined rated rotational speed; and power interrupting means including a brake mechanism for stopping the operation of the power transmission means instantaneously.

In order to achieve a second object, in the card carrier according to the present invention, the upper and lower conveyer rollers of each pair and between which the card carrier passageway extends are together driven. They are placed non-contact with a predetermined spacing. The pressure rollers on the magnetic sensor which reads and writes data from and onto the magnetic recording face of the card are driven in the same direction as the magnetic card is carried, and the rollers are fixed without being energized by a spring or the like.

In order to achieve the third object, in the card carrier according to the present invention, the upper and lower card conveyer passageway members which define the card conveyer passageway each includes a recess facing the head and extending along the direction of extension of the card conveyer passageway such that the magnetic recording face of the card opposing the writing and recording head of the magnetic sensor does not contact the carrier passageway members.

In order to achieve the fourth object, a card carrier according to the present invention includes a pair of rollers disposed at a card insertion slot in the card conveyer passageway, the rollers of the pair being made of a rigid material, and the spacing between the opposing peripheries of the rollers being substantially equal to the thickness of a usable magnetic card.

Other objects and advantageous of the present invention will be easily confirmed from the following detailed description and accompanying drawings.

BRIEF DESCRIPTION OF THE DRAWINGS

FIG. 3 is a view taken along the line C-C of FIG. 2.

FIG. 4 is a view taken along the line D-D of FIG. 2.

FIG. 5 is a cross section view of an essential portion of FIG. 2.

FIGS. 21 and 22 are a schematic side view and a schematic plan view, respectively, of the card carrier according to the present invention, especially showing the positional relationship among a driver such as a motor and other elements.

FIGS. 34–48 illustrate the operation of the control system for the card carrier according to the present invention in conjunction with the position of the conveyed card.

DESCRIPTION OF THE PREFERRED EMBODIMENT

Figure 2:
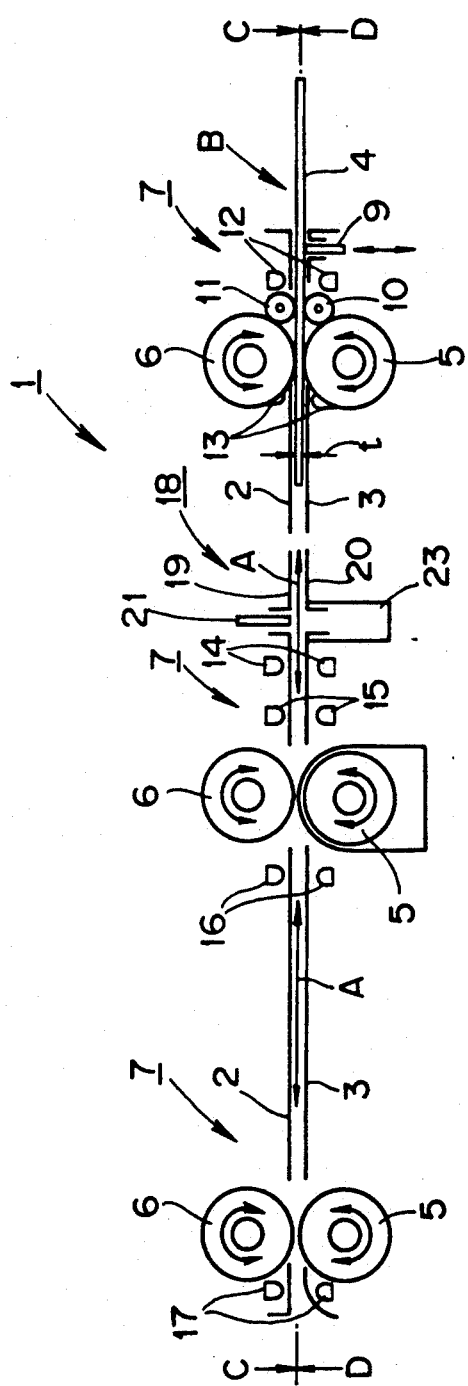
FIG. 2 is a schematic side view of the card carrier.

One embodiment of a card carrier according to the present invention will now be described in detail. FIG. 2 is a schematic side view of a card carrier 1 according to the present invention. In the card carrier 1, a card conveyer passageway A is defined by a pair of an upper and a lower conveyer passageway member 2 and 3 with a predetermined spacing therebetween. A card 4 inserted through a card insertion slot B is moved in one direction and in the opposite direction at predetermined timing within the card conveyer passageway A by a plurality of card conveyer means 7, each including a pair of upper and lower rollers 5 and 6, disposed in the conveyer passageway A at predetermined intervals (of about half the thickness t of a usable card). The lower rollers 5 are made of a relatively rigid material while the upper rollers 6 are made of a softer elastic material, for example, of rigid or soft silicone rubber. A total of six pairs of card conveyer means 7 is provided such that three conveyer means 7 hold one side of the card conveyer passageway A at predetermined intervals and the remaining three conveyer means 7 also hold the other edge of the conveyer passageway A at predetermined distances.

When the card 4 is conveyed by the card conveyer means 7, only both the sides of the card 4 are held between the upper and roller rollers 5 and 6 of the pairs concerned, so that during conveyance the contact of the card conveyer means with the magnetic recording face of the card (the lower face of the card 4 except for both the sides of the card) is eliminated.

The upper and lower conveyer passageway members 2 and 3 of FIG. 2 have parallel elongated recesses 2a and 3a, respectively, extending along the card conveyer passageway A from its start end to its terminating end at positions opposing a like number of writing-reading heads 8a formed on a magnetic sensor 8, as shown in FIGS. 3 and 4 which are views taken in the directions C—C and D—D of FIG. 2.

Thus, as shown in FIG. 5 which is a cross section view of the card conveyer passageway A, dust or the like G entering into and depositing on the card conveyer passageway A portions positioned opposing the magnetic sensor heads 8a deposits all on the recesses 3a. Therefore, when the card 4 moves along the conveyer passageway A, the magnetic data lines 4b closely contacting the sensor heads 8a on the card recording face 4a do not contact dust G and the card conveyer passageway, and the card data lines 4b are not subjected to damages such as scratches. Thus, the data recorded on the card 4 is securely read by the magnetic sensor 8 (FIG. 3).

In FIGS. 2 and 3, a reference numeral 9 denotes a shutter disposed directly after the card insertion slot B and which is driven by a solenoid plunger (not shown) at predetermined timing to thereby close or open the card passageway A.

Figure 6:
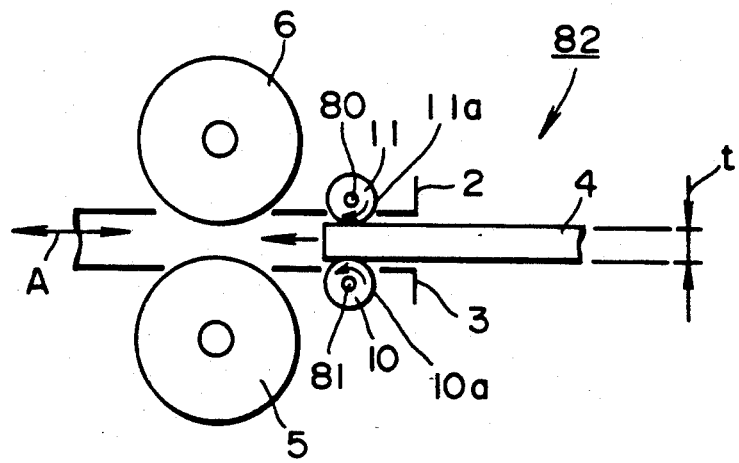
FIGS. 6–8 are a view of an essential portion of FIG. 1 shown on an enlarged scale.

In FIGS. 2–4, and especially in FIG. 6 which is a view of the essential portion of FIG. 2 shown on an enlarged scale, a pair of rollers 10 and 11 is provided directly after the card slot B in the passageway A such that the spacing between the roller peripheries 10a and 11a is substantially the same as the standard thickness t of a usable card 4. The rollers 10, 11 are made of a rigid material having resistance to deformation such as rigid plastic or metal to maintain, to the utmost, the spacing equal to the usable standard thickness. As shown in FIG. 6, the rollers 10 and 11 of the pair are pivoted at shafts 80 and 81 supported on the upper and lower conveyer passageway members 2 and 3, respectively.

Figure 7:
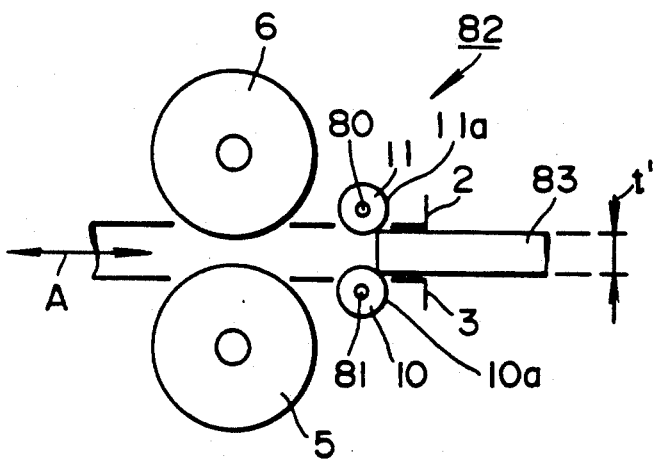

The pair of rollers 10 and 11 and shafts 80 and 81 constitute card insertion restricting means 82 by which a usable card 4 of a standard thickness t is passed between the peripheries 10a and 11a of the rollers 10 and 11 of the pair and inserted into the card conveyer passageway A. As shown in FIG. 7, which uses the same reference numeral as that in FIG. 6 to denote the same part, a false card 83 having a thickness t' greater than the usable standard thickness t is prevented from entering the conveyer passageway A by the spacing between the peripheries 10a and 11a of the rollers 10 and 11.

Figure 8:
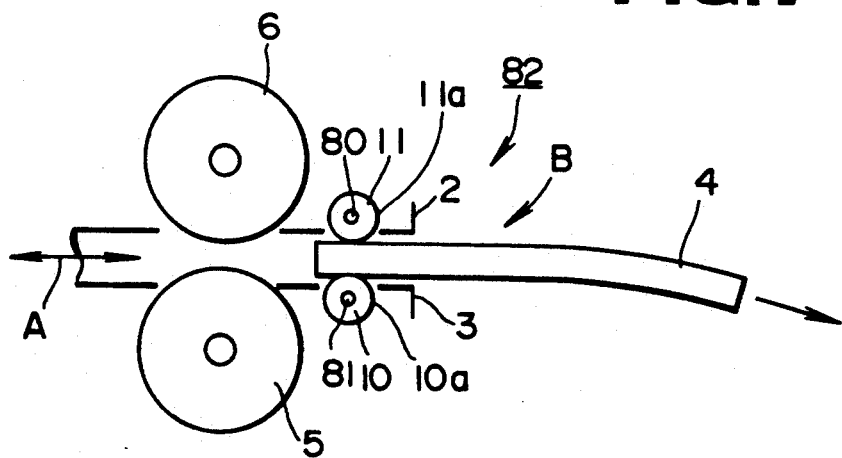

The pair of rollers 10 and 11 not only restricts the thickness of the usable card. When a standard card 4 from and into which reading and writing of data have completed is discharged from the card conveyer passageway A, the frictional force between the rollers 10, 11 and the supporting shafts 80 and 81 act as a breaking force, so that the card 4 does not jump out with great force from the card insertion slot B in the conveyer passageway A as shown in FIG. 8, but is discharged from the card slot B with a moderate velocity, and bitten and stopped between the rollers 10 and 11.

Figure 9:
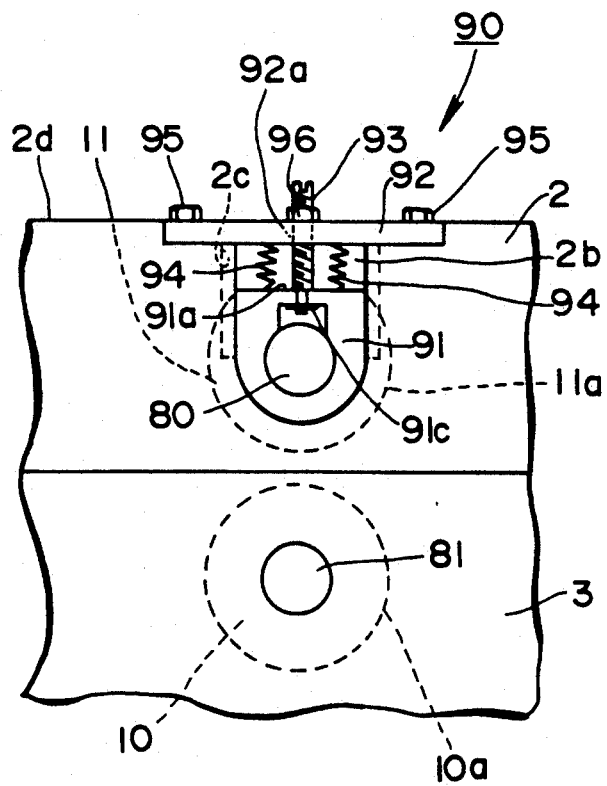
FIGS. 9 and 10 are a view of an essential portion of FIG. 2 showing an inter-shaft distance adjusting unit on an enlarged scale.

In the card insertion restricting means 82, the spacing between the roller peripheries 10a and 11a is required to be adjusted to be substantially equal to the standard thickness t of the usable card, so that an intershaft distance adjusting unit 90 is provided which strictly controls and adjusts the spacing between the roller peripheries 10a and 11a at each of both ends of the shaft 80 which supports the roller 11 alone, as shown in FIG. 9 which is a view of the essential portion of FIG. 6 shown on an enlarged scale. The inter-shaft distance adjusting unit 90 includes a slider 91 disposed slidably vertically via a slide groove 2c within a U-like notch 2b formed in the upper conveyer passageway member 2 in the vicinity of its edge and supporting the shaft 80 of the roller 11, an inter-shaft distance adjusting screw 93 which has an end supported rotatable in an upper portion 91a of the slider 91, supported unremovably by a cramp 91c such as an E-like ring and screwed into female threads 92a in a plate 92 fixed to an upper surface 2d of the upper conveyer passageway member 2, and a pair of coil springs 94 disposed between the slider 91 and the plate 92.

In FIG. 9, reference numeral 95 denotes bolts which fix the plate 92 to the upper surface 2d of the upper conveyer passageway member 2 and reference numeral 96 denotes a lock nut which fixes the screw 93 to the plate 92.

Figure 10:
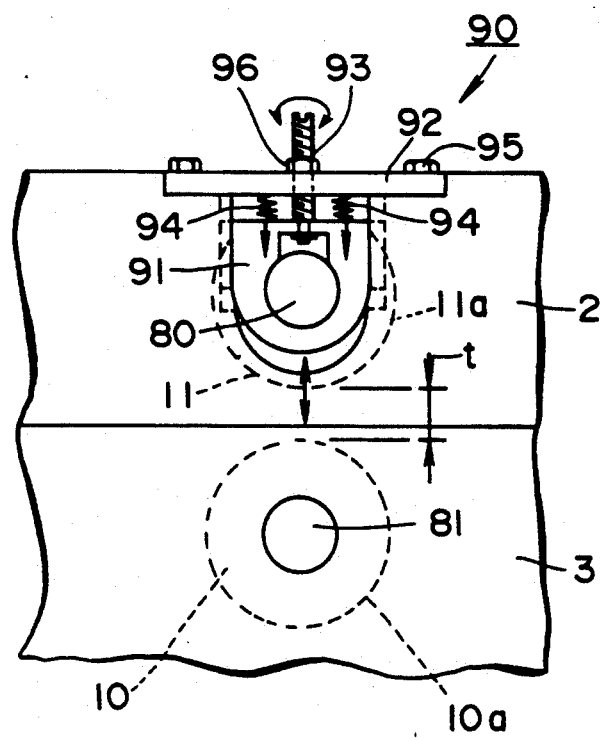
Figure 11:
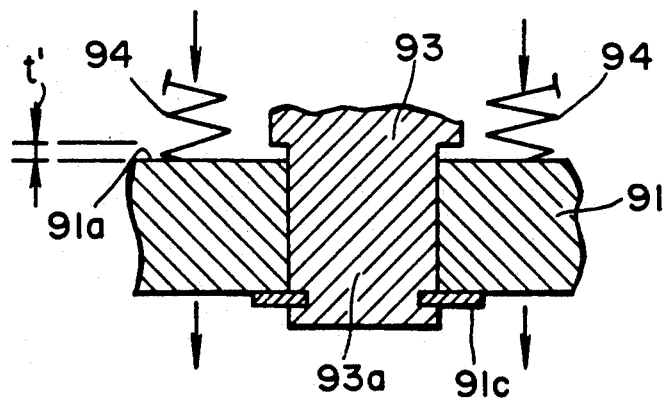
FIG. 11 is a view of an essential portion of FIG. 9 shown on an enlarged scale.

In order to adjust the distance between the roller peripheries 10a and 11a using the inter-shaft distance adjusting unit 90, as shown in FIG. 10, the inter-shaft distance adjusting screw 93 is rotated clockwise or counterwise to lift or lower the slider 91 to thereby adjust the inter-shaft distance between the rollers 10 and 11 and hence the distance t between the roller peripheries 10a and 11a. As shown in FIG. 11 which is a view of an essential portion of FIG. 9 shown on an enlarged scale, there can be a slight play t' between the upper portion 91a of the slider 91 and the base of an screw end portion 93a which extends through the slider 91 in order to allow the rotation of the screw 93. The play t' is absorbed normally by a downward shift of the slider 91 which is pressed downwardly normally by the resiliency of the springs 94 as shown in FIG. 9, so that the spacing t (FIG. 6) between the roller peripheries 10a and 11a is strictly controlled even before and after the inter-shaft distance adjustment.

The adjusting unit 90 may be used further to adjust the distance between the peripheries of the rollers 5 and 6 of the card conveyer means 7.

In FIG. 2, reference numerals 12–17 denote a photosensor which senses a respective position of the card 4 in the card conveyer passageway A. In accordance with the output detection signals from the corresponding photosensors, the operation of the driver and punch mechanism is controlled by a controller to be described later in more detail, and the movement of the card 4 is also controlled. Reference numeral 18 denotes a punch mechanism which makes a punched hole in the card 4 in the vicinity of its side and which punch mechanism 18 is supported on the upper conveyer passageway member 2. The punch mechanism includes an upper plate 19 constituting a part of the upper conveyer passageway member 2, a lower plate 20 constituting a part of the lower conveyer passageway member 3 and supported by the upper conveyer passageway member 2, and a punch plunger 21 moved vertically by a solenoid plunger to be described later in more detail to form a punched hole in a predetermined position in the card 4 in the vicinity of its side.

Figure 12:
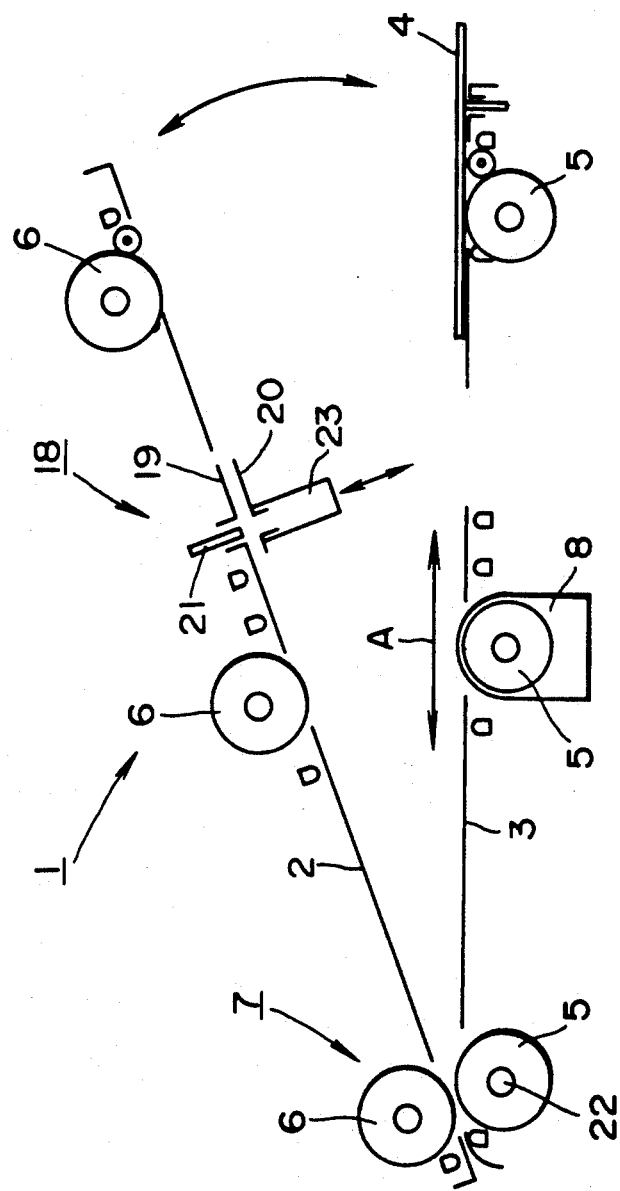
FIG. 12 is a schematic side view of a card carrier, showing the card conveyer passageway on an enlarged scale.

As shown in FIG. 12, during maintenance, if the upper converyer passageway member 2, is rotated counterclockwise around a drive shaft 22 supporting the roller 5 of the card conveyer means 7 disposed at the rear end of the card conveyer passageway A to open the card conveyer passageway A, the whole punch mechanism 18 including the lower plate 20 moves upwardly together with the upper conveyer passageway member 2. Since a cylindrical chad container 23, supported fitted into the lower plate 20 of the punch mechanism 18, moves also upwardly, the container 23 is easily cleaned by removing the container 23 from the lower plate 20 of the punch mechanism 18 under the condition shown in FIG. 12, discharging the chads out of the container and fitting the container 23 again into the lower plate 20 of the punch mechanism 18.

Figure 13:
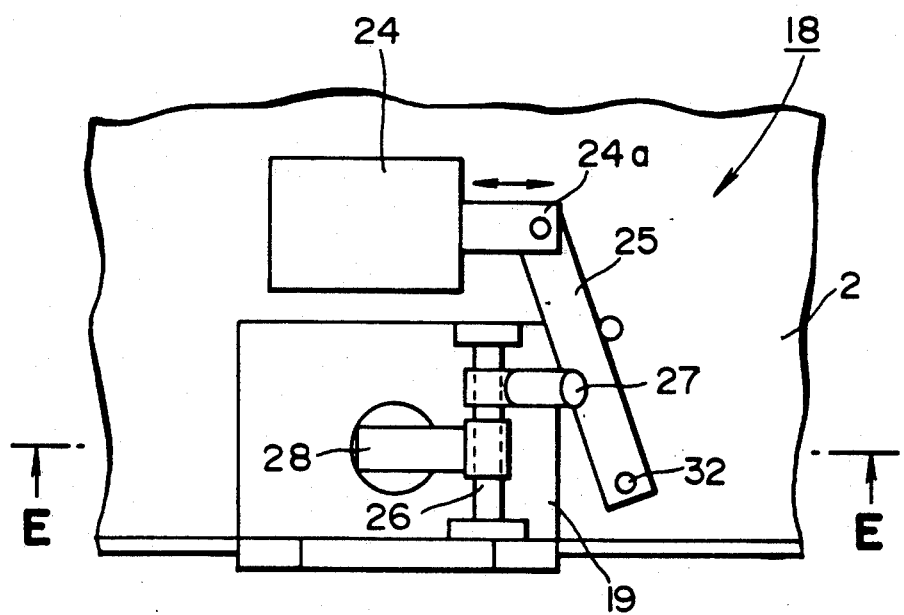
FIG. 13 is a cross section view of an essential portion of an upper carrier passageway member shown on an enlarged scale.
Figure 14:
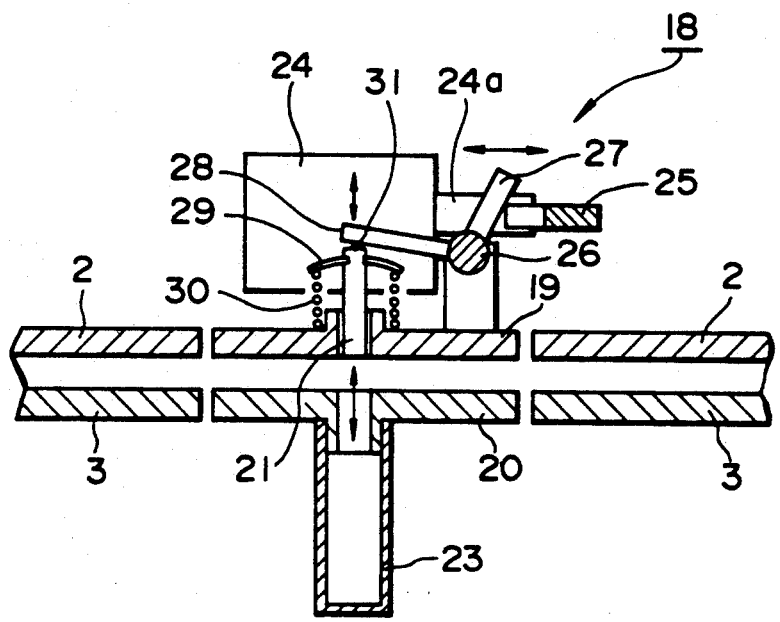
FIG. 14 is a cross section view taken along the line E—E of FIG. 13.

As shown in FIG. 13 which is a plan view of the essential portion of the upper conveyer passageway member 2 shown on an enlarged scale and in FIG. 14 which is a cross section view taken along the E—E of FIG. 13, the punch mechanism 18 includes a solenoid 24 which operates in response to a drive signal from a controller (not shown), an arm 25 supported at an end of a plunger 24a of solenoid 24, a pair of arms 27 and 28 fixed to a shaft 26 supported rotatably over upper plate 19, a receiver 29 fixed to an upper end of punch plunger 21, as shown in FIG. 14, and a coil spring 30 disposed between the upper plate 19 and receiver 29. Rotatably fitted in the rear end of punch plunger 21 is a hard ball, 31 which is pressed against arm 28 fixed to the shaft 26. Arm 27 abuts on arm 25 supported by plunger 24a.

According to the punch mechanism 18, solenoid 24 operates as shown in FIG. 13. If plunger 24a is drawn leftward in FIG. 13, arm 25 is rotated counter-clockwise around support shaft 32, and arm 27 is also rotated counterclockwise around shaft 26 by the action of arm 25. Thus, as shown in FIG. 14, arm 28 is also rotated counter-clockwise around shaft 26 to move punch plunger 21 downwardly against the action of coil spring 30 to thereby make a punch hole in a card in the vicinity of its side positioned between upper and lower plates 19 and 20. As shown in FIG. 14, in the punch mechanism 18, since hard ball 31 is disposed rotatably between arm 28 and punch plunger 21, the rotation of arm 28 is converted smoothly to a vertical motion of punch plunger 21.

Figure 1:
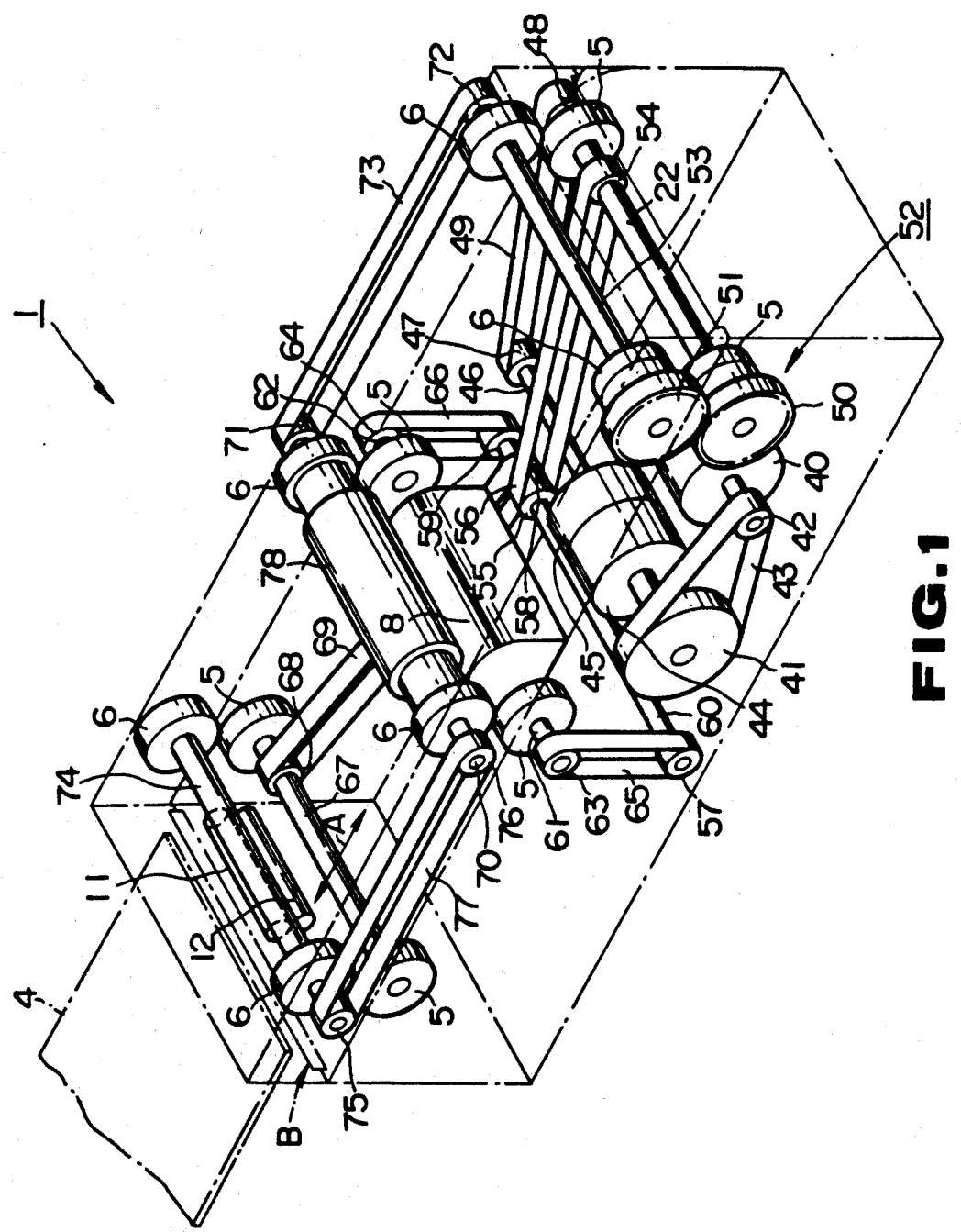
FIG. 1 is a schematic perspective view of a card carrier according to the present invention.

Drive means which drives card conveyer means 7 comprising the pair of rollers 5 and 6 to convey the card 4, means for interrupting the supply of power to the drive means, and means for transmitting power to drive means are constructed as shown in a schematic perspective view in FIG. 1. The power transmitting means mainly includes two parts, one power transmission submeans for rotating the respective rollers 5 below the card conveyer means 7 in one direction, and the other power transmission submeans for rotating upper rollers 6 of card conveyer means 7 in the direction opposite to the direction, of rotation of roller 5. Each of these submeans is driven through drive means comprising a single motor 40, a clutch mechanism 44 which transmits the power of the motor 40 when same arrives at a rated rotational speed, and a brake mechanism 45 which stops the operation of that power transmission submeans instantaneously. The power transmission means includes timing pulleys fixed to the shafts supporting rollers 5 and 6, and a timing belt extending around the timing pulleys. The brake mechanism 45 and clutch mechanism 44 include an electromagnetic brake and an electromagnetic clutch respectively, operated by a control signal from a controller to be described later in more detail.

The power transmission system will now be described. The drive force from motor 40 is transmitted via timing belt 43 extending around timing pulley 41 of a large diameter and a timing pulley 42 of a smaller diameter to shaft 46 supporting clutch mechanism 44 and brake mechanism 45. The power transmitted to shaft 46 is transmitted via timing belt 49 extending around timing pulleys 47 and 48 of a small diameter to shaft 22 fixed to roller 5 of card conveyer means 7. The power transmitted to shaft 22 disposed at the rear end of card conveyer passageway A is now transmitted via a gear transmission mechanism 52 comprising a pair of gears 50 and 51 disposed at an end of shaft 22 to shaft 53 which fixes the other roller 6 thereon. The power transmitted to shaft 22 is transmitted via timing belt 56 extending around timing pulleys 54 and 55 of a smaller diameter disposed below the middle portion of card conveyer passageway A to shaft 60 which fixes timing pulleys 55, 57, 58 and 59 of a smaller diameter. The power transmitted to shaft 60 is then transmitted via timing belts 65 and 66 extending around timing pulleys 63, 64 of a smaller diameter and the other timing pulleys to shafts 61 and 62 which support rollers 5 one disposed at each end of magnetic sensor 8. The power transmitted to shaft 60 is also transmitted via timing pulleys 68, 58 of a smaller diameter and timing belt 69 extending around pulleys 68, 58 to shaft 67 which supports rollers 5 disposed directly after card insertion slot B in the card conveyer passageway A.

The power transmitted to shaft 53 which supports rollers 6 via gear transmission mechanism 52 from shaft 22 is now transmitted via timing pulleys 71, 72 of a smaller diameter and timing belt 73 extending around timing pulleys 71 and 72 to shaft 70 which fixes rollers 6 and supported above magnetic sensor 8. The power transmitted to shaft 70 is transmitted via timing pulleys 75 and 76 of a smaller diameter and timing belt 77 extending around timing pulleys 75 and 76 to shaft 74 which fixes rollers 6 disposed directly after card insertion slot B in the card conveyer passageway A.

In FIG. 1, a pressure roller, 78 is disposed at a predetermined spacing (substantially equal to half the thickness of a usable card) above magnetic sensor 8 to cause the carried card 4 to closely contact magnetic sensor 8. It is fixed to shaft 70, rotates together therewith, does not move vertically relative to sensor 8 and is supported on the upper passageway member 2. Pressure roller 78 is made of a very soft elastic material, for example, of soft silicone rubber.

Figure 15:
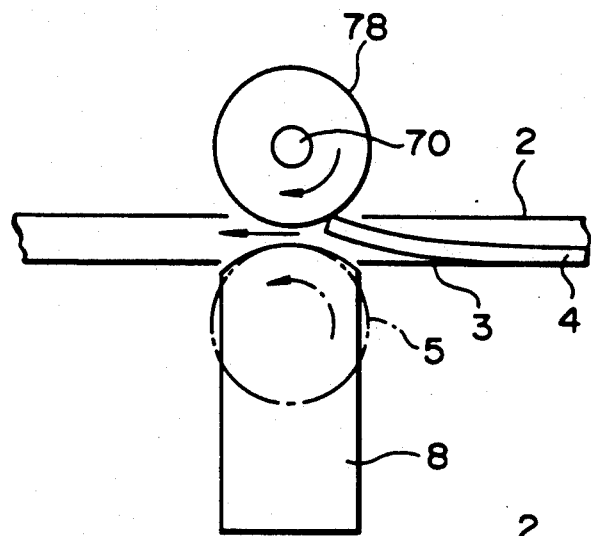
FIGS. 15–17 are a view of an essential portion of FIG. 2, showing on an enlarged scale the positional relationship between a magnetic sensor and a pressure roller.
Figure 16:
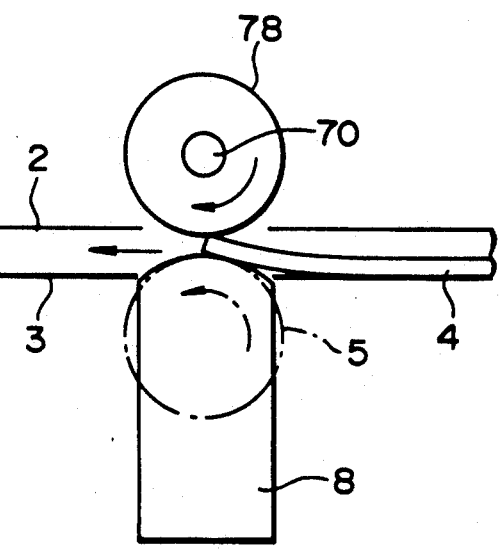
Figure 17:
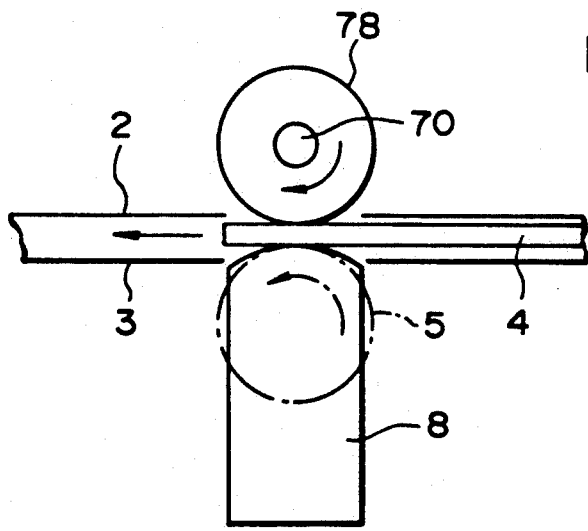

As shown in FIGS. 15-17, which are a side view of the essential portion of FIG. 1 shown on an enlarged scale, for example, even if card 4 is carried with its leading end being lifted, or even if it impinges on pressure roller 78 in its normal conveyance attitude, pressure roller 78 is rotated in the same direction as the card 4 by the power transmission means, so that card 4 is inserted at its leading end between pressure roller 78 and magnetic sensor 8 by compulsive rotation of pressure roller 78 (FIGS. 15-17).

Even if card 4 is carried in card conveyance passageway A at high speed and impinges on pressure roller 78, pressure roller 78 is driven at the same speed as the card conveyer, and does not jump because the vertical movement of shaft 70 is restricted. Since vibrations of card 4 generated on collision are absorbed by the elastisty of pressure roller 78 itself, the magnetic recording face of card 4 securely contacts magnetic sensor 8 closely from its leading end, and reading and writing of magnetic card data during high speed conveyance are performed further securely.

Figure 18:
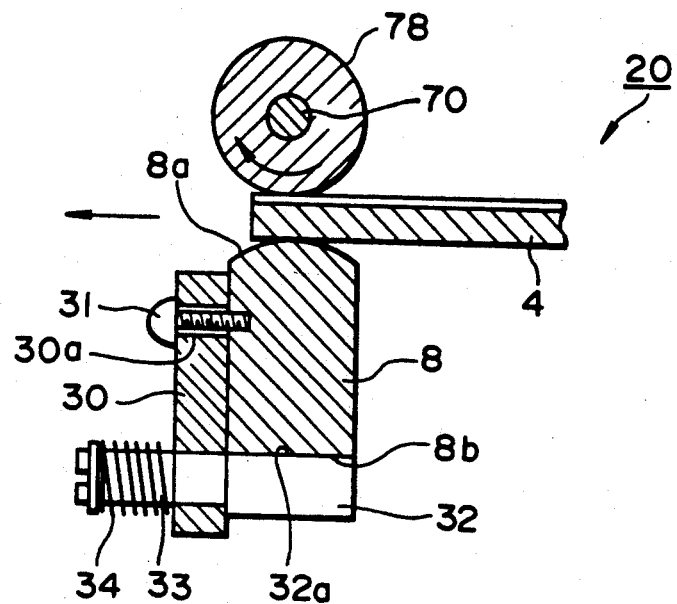
FIGS. 18–20 schematically illustrate a positioning unit of the magnetic sensor.

As shown in FIG. 18 which is a cross section view of the essential portion of FIG. 1 shown on an enlarged scale, magnetic sensor 8 is fixedly supported by a pair of fixing screws 31 to a mounting bracket 30 fixed to the lower conveyer passageway member 3. The bottom 8b of magnetic sensor 8 is supported by a pair of cam faces 32a of eccentric cylindrical cams 32 formed on corresponding ends of shafts 33. In FIG. 18, a coil spring 34 restricts the rotation of shaft 33 and fixes it.

Figure 19:
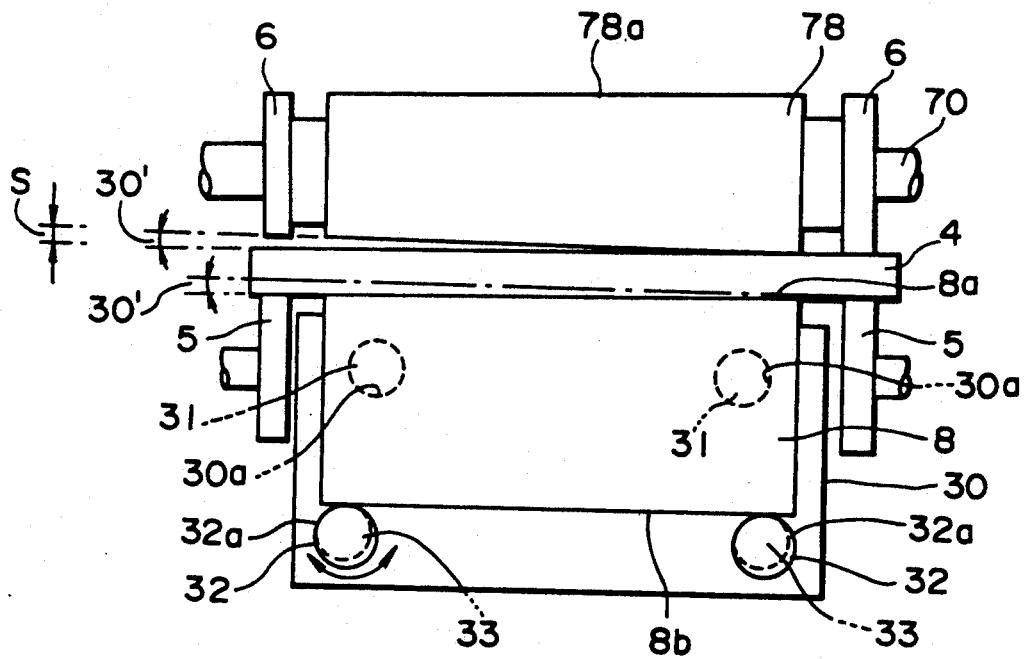

As shown in FIG. 19 which shows the right-hand side of FIG. 18, if the magnetic reading face 8a of the magnetic sensor has a left-hand angular error of 30' to the horizontal due to an error involved in the grinding of the face 8a, or similarly, if the pressure roller surface 78a has an angular error of 30' to the horizontal due to manufacture, there occurs an angle of 1° or less between the magnetic reading face 8a of magnetic sensor 8 and pressure roller surface 78a even if magnetic sensor 8 is mounted relative to a mounting hole 30a formed in bracket 30. Therefore, the spacing between the sensor 8 and pressure roller 78 is not constant, a tapering spacing s is produced on the left-hand of card 4, so that the pressure of roller 78 on the left-hand of card 4 is insufficient. Under such condition, the magnetic data recorded on card 4 cannot be read surely by magnetic sensor 8.

Figure 20:
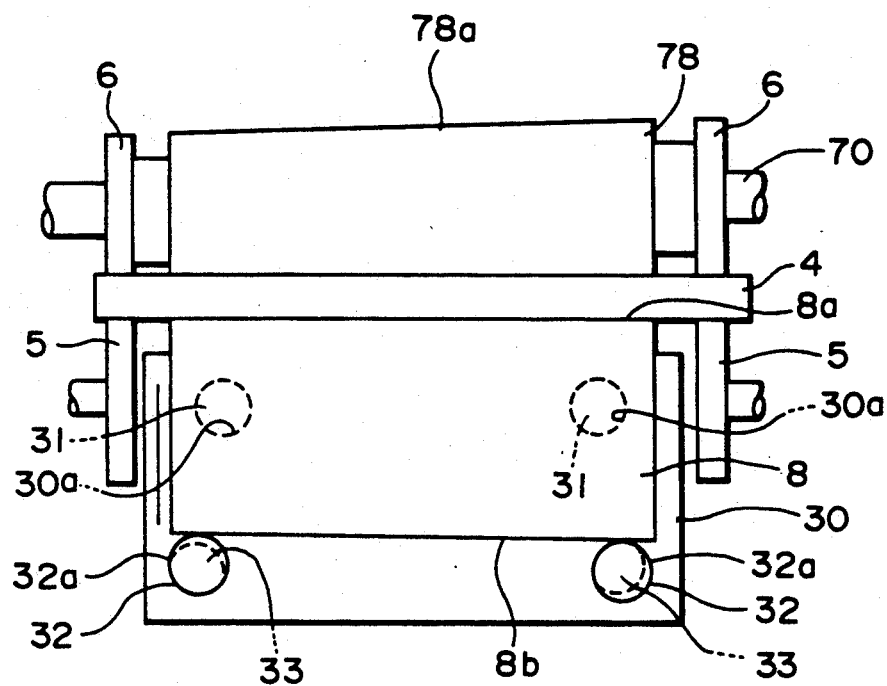

The fixing holes 30a in bracket 30 are slightly elongated vertically as shown in FIG. 18. If the left-hand shaft 33 is rotated from the state of FIG. 19 to shift cam 32 and hence cam face 32a, the left-hand portion of magnetic sensor 8 moves upwardly as shown in FIG. 20 in which the same member as in FIG. 19 is given the same reference. Therefore, an angle or inclination produced between magnetic reading face 8a of the magnetic sensor and pressure roller surface 78a is corrected, so that the spacing between the magnetic sensor 8 and pressure roller 78 becomes uniform, and the magnetic recording face 4a of card 4 closely contacts the magnetic reading face 8a of the magnetic sensor due to the uniform pressure of pressure roller 78. Therefore, if card 4 is moved between magnetic sensor 8 and pressure roller 78 under the condition of FIG. 20, the magnetic data on card 4 is securely read by magnetic sensor 8.

The operation and structure of card carrier 1 will now be described in more detail. FIG. 21 schematically illustrate the positional relationship between the power source, solenoid plunger, and the sensors which sense the positions of the card in the card carrier according to the present invention. Like numerals denote like parts through FIGS. 21 and 2. The photosensors 12, 13, 14, 15, 16 and 17 in FIG. 2 are represented by PSW1, PSW2, PSW3, PSW4, PSW5 and PSW6, respectively, in FIG. 21. In FIG. 21, rollers 16a (16b), 21a (21b), 23a (23b) correspond to those rollers 6 disposed in this order from the right-hand side of FIG. 2 above the conveyer means 7 of FIG. 2, and the rollers 15a (15b), 20a (20b) and 22a (22b) of FIG. 21 correspond to those rollers 5 disposed in this order from the right-hand side of FIG. 2 under the card conveyer means 7 of FIG. 2.

In FIG. 21, a solenoid 100 is used to lift and lower shutter 9. When solenoid 100 is supplied with electric current and electrically energized, shutter 9 is drawn and opened by solenoid 100 while when the electric current supply to solenoid 100 is stopped and same is deenergized, shutter 9 is jumped out by a spring (not shown) to thereby close shutter 9. A magnetic card inserted from card insertion slot B via shutter 9 into card conveyer passageway A is first sensed by sensor PSW1, which may be a photosensor which optically senses a card in the card conveyer passageway A.

The magnetic card, namely, a coupon ticket card, a prepaid card or a commutation ticket card, the insertion of which is sensed by sensor PSW1, comes to the position where the rollers 10 and 11 are disposed to check the thickness of the card. A card having a thickness greater than a predetermined value determined by the distance between the rollers 10 and 11 cannot pass between the rollers 10 and 11 and, namely, is rejected.

In FIG. 21, an encoder 101 of motor 40 senses a quantity of rotation of motor 40.

After the card is inserted into slot B, and arrives via shutter 9, sensor PSW1 and rollers 10 and 11 at the positions where rollers 15a, 15b, 16a and 16b are disposed, it is held at both sides by rollers 15a, 16a, 15b 16b and carried through the card conveyer passageway A.

The punch plunger 21, mentioned above, is disposed in the card conveyer passageway A. It is protruded through a hole 102 in the card conveyer passageway A by the energization of solenoid 24 such that it forms a punch hole in a predetermined position in the magnetic card, for example a coupon ticket card, in the card conveyer passageway A. The positioning of the coupon ticket card or the prepaid card is performed using the output of encoder 101. The punch hole formed in the card is used as a criterion to confirm a quantity of use of the coupon ticket card or prepaid card.

The read-write head, namely, magnetic sensor 8, is disposed in the card conveyer passageway A. As shown in FIG. 22 which is a plan view of the lower conveyer passageway member 3, magnetic sensor 8, for example, includes a 10-track magnetic head. The two central tracks are used for the coupon ticket, and prepaid card and the eight remaining tracks are used for a commutation ticket. While in the particular embodiment, reading and writing of data are performed from and into the coupon ticket card or prepaid card, and only reading of data is performed from the commutation ticket card, so that the two central tracks are used for reading and writing and the eight remaining tracks are used for reading only. In FIG. 22, recesses 3a of FIG. 3 are not shown.

In addition to sensor PSW1, five sensors PSW2, PSW3, PSW4, PSW5 and PSW6 are disposed in the card conveyer passageway A, as mentioned above. The sensors PSW2, PSW4 are used for checking the length of the inserted card. If sensor PSW4 becomes active when sensor PSW2 is active, the output from encoder 101 is counted from this time to the time when sensor PSW2 becomes non-active. If this count does not arrive at a predetermined value, the card is regarded as not coinciding with a predetermined value and returned.

Sensor PSW3 is used for confirming a punch hole formed in a coupon ticket card.

Sensor PSW5 is used for sensing a lasting stop of card MC (magnetic card 4 shown in FIG. 1) between sensor PSW6 and magnetic sensor 8 to perform subsequent necessary processings because this condition cannot be sensed by other sensors.

Sensor PSW6 senses the arrival of the leading end of the card at a reversal position. If this condition is sensed by sensor PSW6, motor 40 is reversed and the card is carried in the reverse direction along the card conveyer passageway A.

Figure 23:
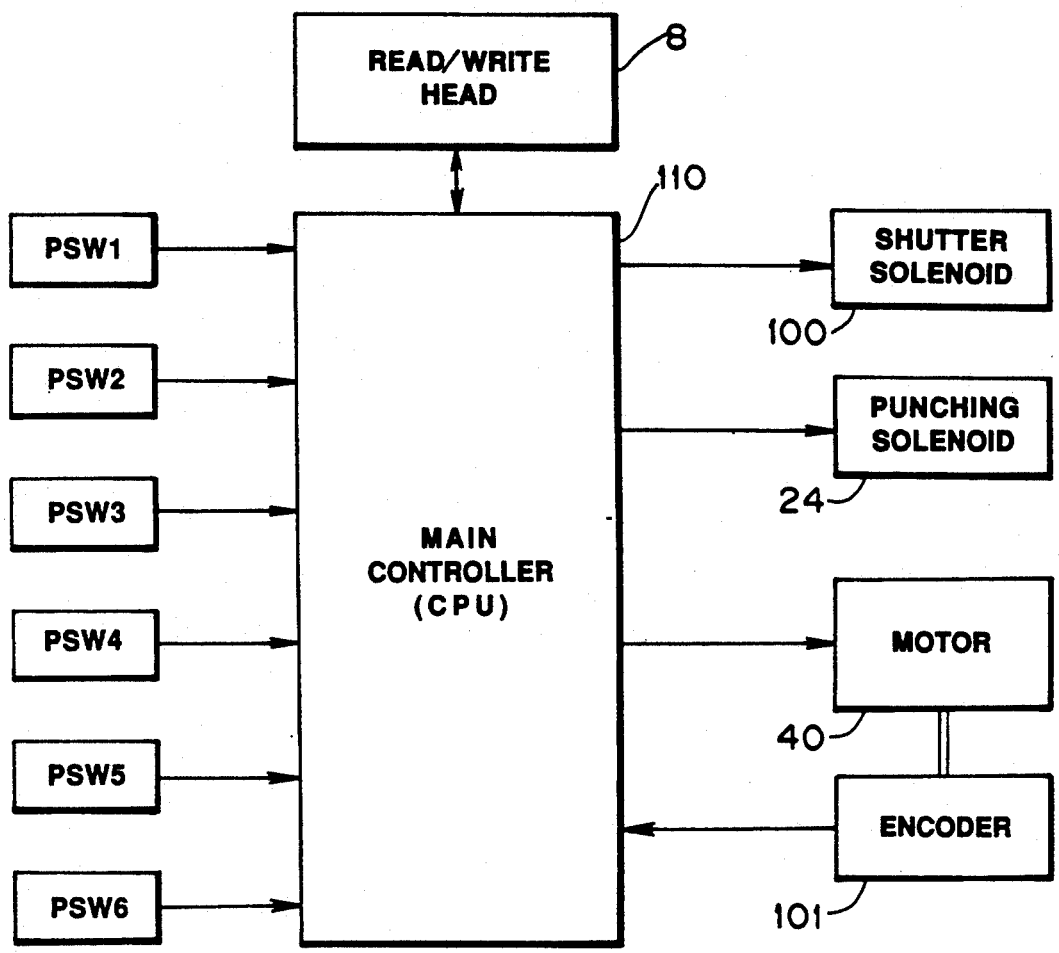
FIGS. 23 is a block diagram of one example of a control system for the card carrier according to the present invention.

The card carrier is controlled by a main controller connected to the card carrier on an on-line basis. FIG. 23 illustrates the connection between main controller 110 and the respective elements of the card carrier. The six sensors PSW1, PSW2, PSW3, PSW4, PSW5 and PSW6 disposed in the card carrier and encoder 101 connected to motor 40 supply data indicative of the respective states in the card carrier to main controller (CPU)110. Main controller 110 controls shutter solenoid 100, punch solenoid 24, magnetic sensor 8 and motor 40 in accordance with outputs of sensors PSW1-PSW6 and encoder 101.

FIGS. 24-33 are a flowchart showing one example of control of the respective elements of the card carrier by main controller 110. FIGS. 34-48 illustrate card conveyance under such control.

Figure 24:
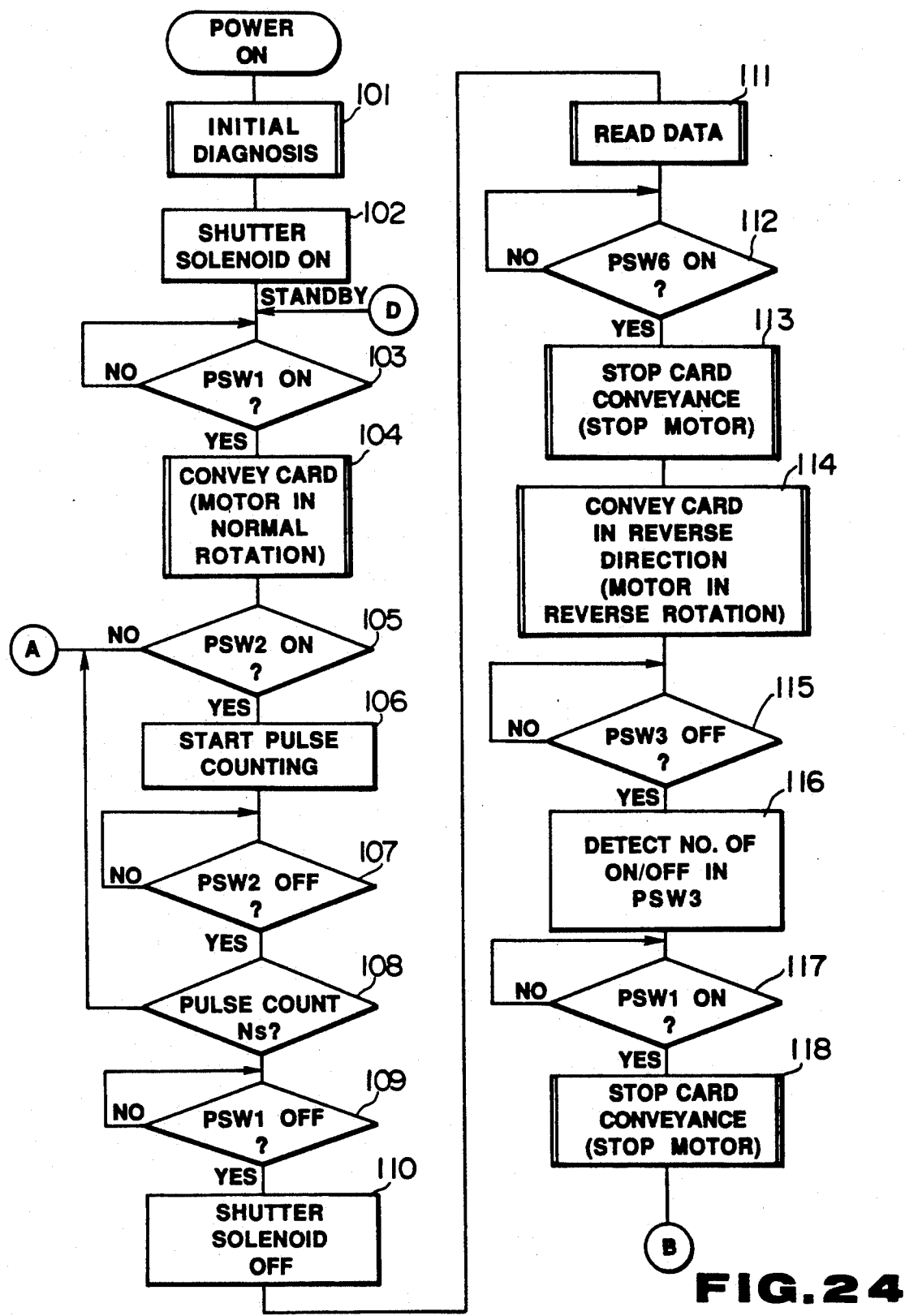
FIGS. 24–33 are a flowchart showing the operation of the control system for the card carrier according to the present invention.

In FIG. 24, when the power source for the card carrier is turned on, an initial diagnosis is performed which includes checking whether there is no abnormality in starting the drive of the card carrier (step 101). Details of this initial diagnosis is shown as a subroutine in FIG. 27.

Figure 27:
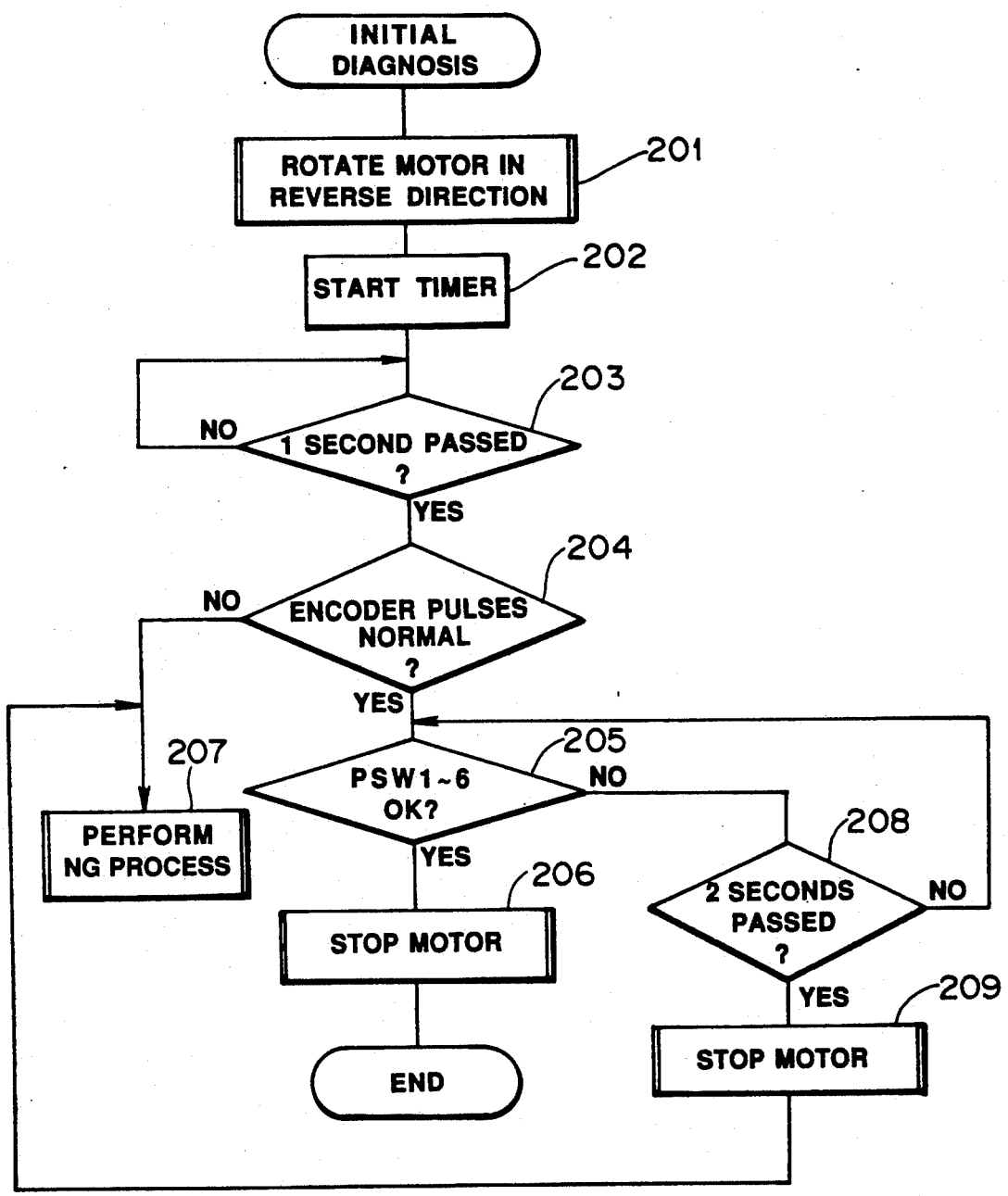

In FIG. 27, first, motor 40 is reversed (step 201). The reversal of motor 40 is performed by a subroutine of FIG. 29 in which, first, brake mechanism 45 is energized (step 401) and then the reversal of motor 40 is started (step 402). Subsequently, a timer (not shown) in main controller 110 is started (step 403). If the counted time in the timer arrives at 30 ms (milliseconds) (step 404), brake mechanism 45 is deenergized and clutch mechanism 44 is energized (step 406). Thus rollers 15a, 15b, 16a, 16b, 20a, 20b, 21a, 21b, 22a, 22b and 23a, 23b are rotated in the direction opposite to that shown by arrow in FIG. 21. If card MC remains inserted in the card conveyer passageway A of the card carrier, the card is discharged from the card slot B. The reason why the sequential operation including energization of the brake, starting the motor, deenergization of the brake, and energization of the clutch when motor 40 is started is performed is to ensure the drive of the rollers after the rotation of motor 40 arrives at a stabilized state.

In FIG. 27, when the reversal of motor 40 is started(-step 201), the timer is started (step 202). When the counted time in the timer amounts to 1 second (step 203), it is determined whether the pulses output from encoder 101 are normal (step 204). If so, it is determined whether sensors PSW1-PSW6 are normal or not (step 205). Whether the pulses output from encoder 101 are normal is determined using as normal the situation where, for example, pulses from encoder 101 and corresponding to the motor speed are output periodically. Whether sensors PSW1-PSW6 are normal or not is determined using as normal the case whether, for example, all the sensors PSW1-PSW6 are off (Under such condition, no card is inserted into the card conveyer passageway A, so that all sensors PSW1-PSW6 should be off). Alternatively, sensors PSW1-PSW6 may be given a dummy signal to check whether the respective sensors PSW1-PSW6 are turned on and off to determine whether the respective sensors are normal or not.

If sensors PSW1-PSW6 are determined to be normal at step 205, the motor 40 which is being driven in the reverse direction is stopped (step 206). The stopping control of motor 40 is performed by the subroutine of FIG. 30. First, motor 40 is turned off, brake mechanism 45 is energized, and clutch 29 is deenergized (step 501). Subsequently, the timer is started (step 502). If the time counted by the timer amounts to 30 ms (step 503), brake mechanism 45 is deenergized (step 504) to thereby terminate the stopping control of the motor.

If the pulses output from encoder 101 are determined to be abnormal at step 204 of FIG. 27, a predetermined N.G. processing, for example, causing a buzzer to go and urgent stop of the motor is performed (step 207).

Figure 30:
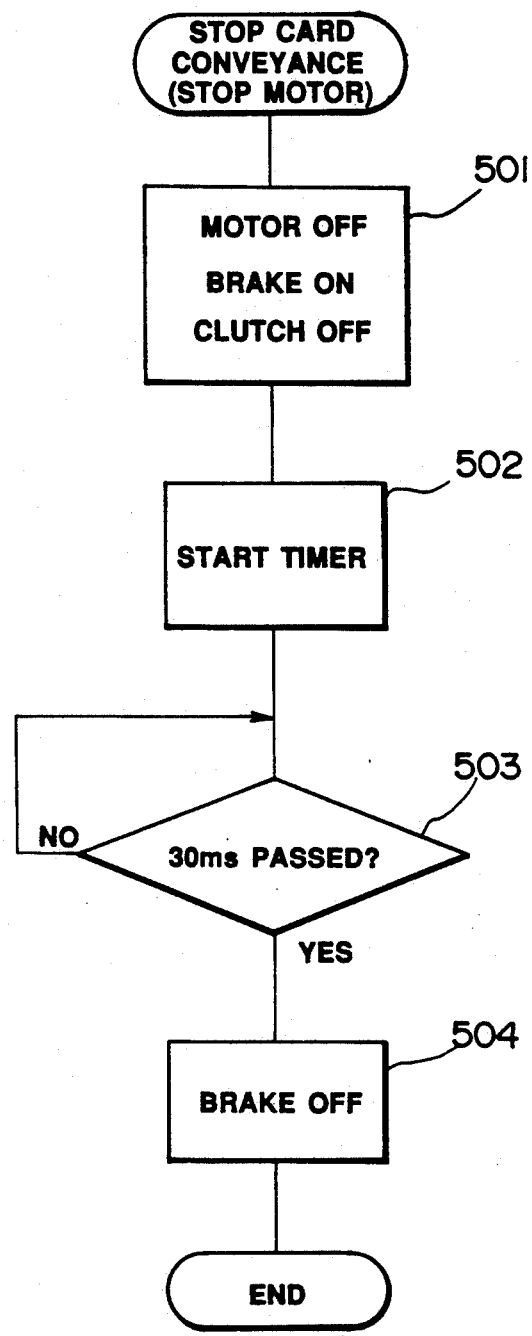

If sensors PSW1 - PSW6 are determined to be abnormal at step 205 of FIG. 27, the measured time in the timer is watched (step 208). If this time amounts to two seconds, the motor 40 is stopped (step 209). Thereafter, control passes to step 207 where the predetermined N.G. processing is performed. The stopping control of the motor at step 209 is similar to that at step 206, and the details thereof are shown in FIG. 30.

When the initial diagnosis is completed at step 101 of FIG. 24, shutter solenoid 100 is energized to open card insertion slot B and hence to bring about a standby state (step 102).

Figure 34:
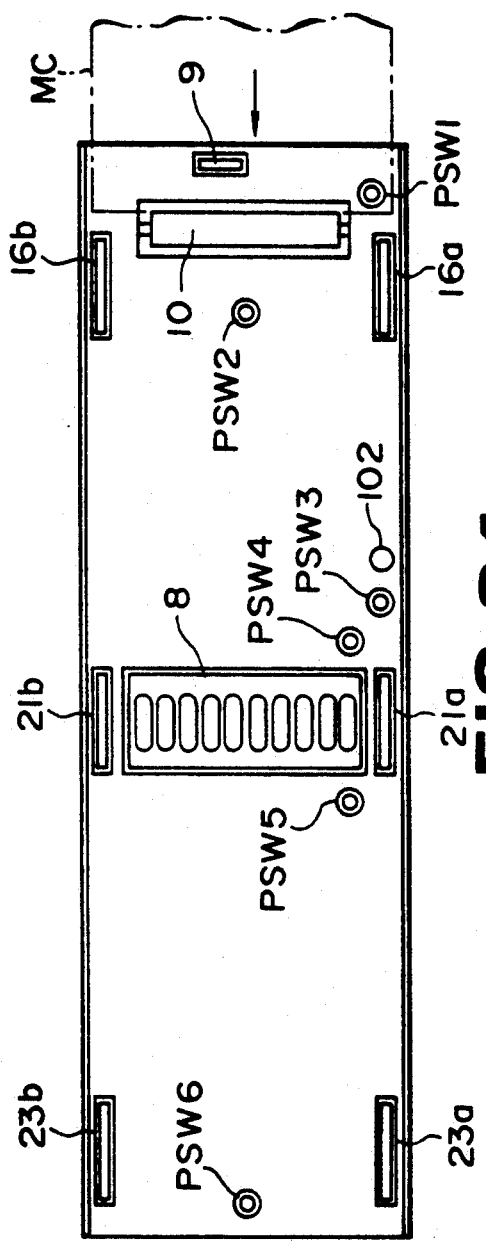
Figure 35:
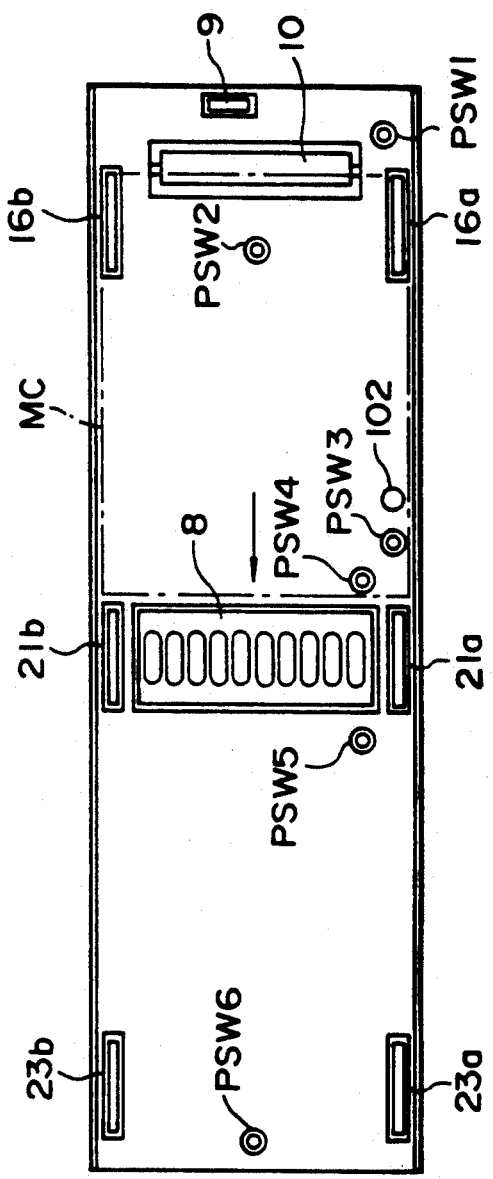
Figure 38:
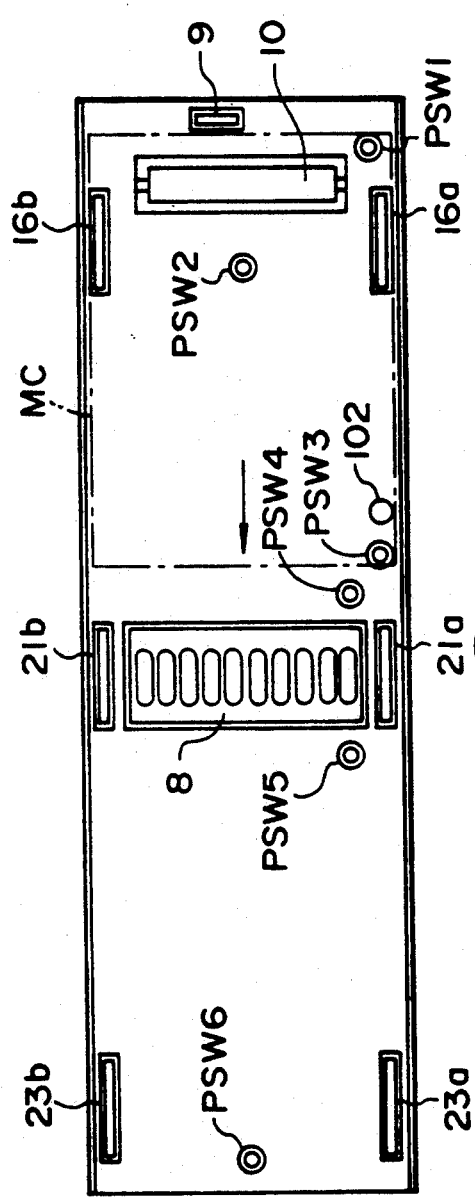

Under such condition, if card MC is inserted into slot B as shown in FIG. 34 to thereby turn on sensor PSW1, this fact is sensed at step 103, motor 40 is rotated forwardly, and card MC is started to be conveyed (step 104). This conveyance control of card MC is illustrated as a subroutine in FIG. 28 in which, first, brake mechanism 45 is energized (step 301) and motor 40 is rotated forwardly (step 302). Subsequently, the timer is started (step 303). When the measured time in the timer arrives at 30 ms (step 304), brake mechanism 45 is deenergized (step 305), and then clutch mechanism 44 is energized (step 306). Thus rollers 15a, 15b, 16a, 16b, 20a, 20b, 21a, 21b, 22a, 22b, 23a, and 23b are rotated individually in the directions shown by arrow in FIG. 21 and thus the inserted card MC is conveyed in the direction of arrow in FIG. 35.

When the conveyance of card MC turns on sensor PSW 4 under the situation where sensor PSW2 is on, pulses output from encoder 101 are started to be counted (step 106). If sensor PSW2 is turned off (step 107), it is determined whether the count (the number of pulses) at that time has arrived at a predetermined value Ns (step 108). If not, it is determined that the length of the inserted card MC does not satisfy a predetermined length. If sensors PSW2 and PSW4 are together not turned on at step 105 and if the length of the card MC is determined not to satisfy the predetermined length at step 108, control branches to step 138 of FIG. 26 and the card is returned.

Figure 31:
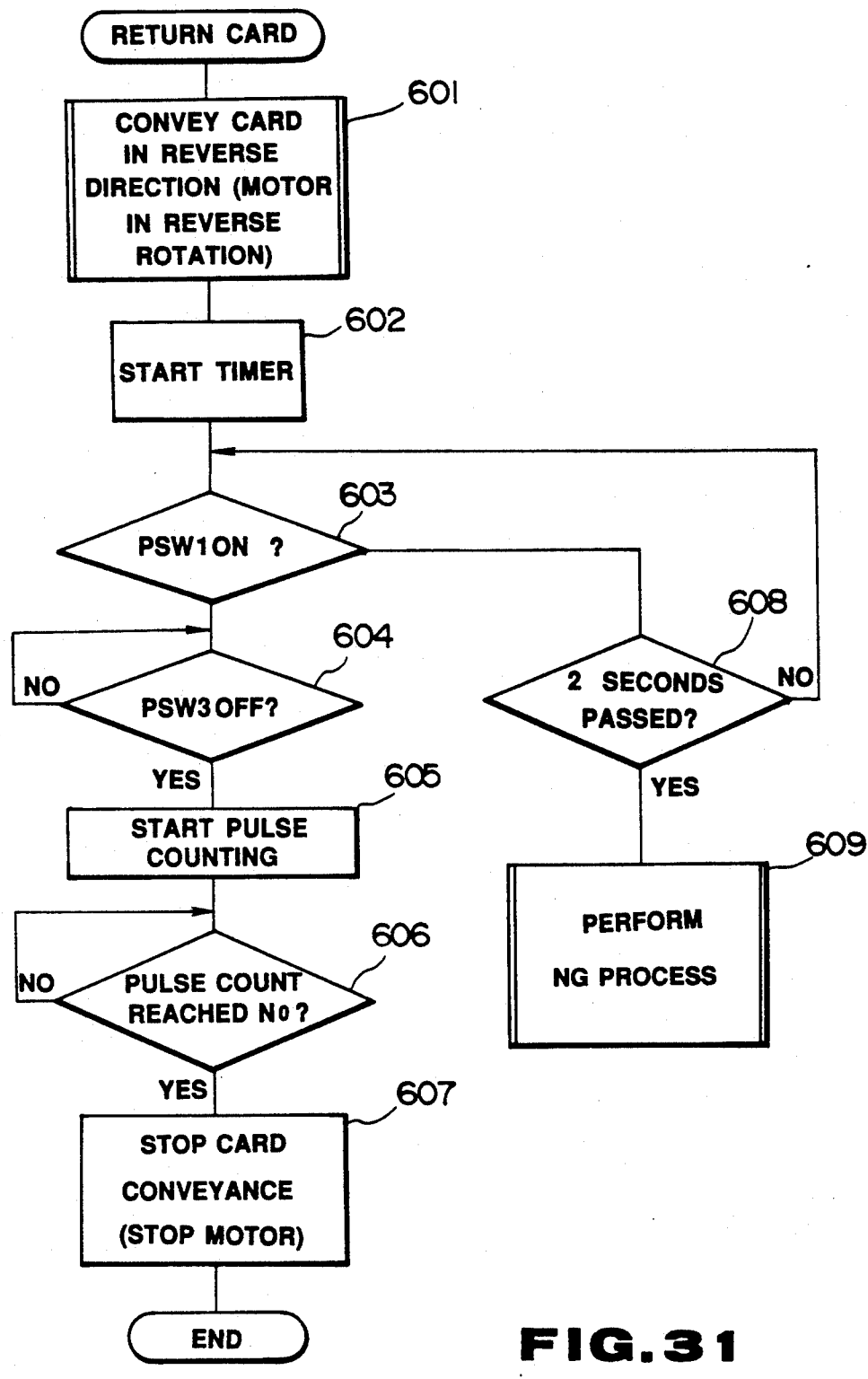

The details of the return of card is illustrated as a subroutine in FIG. 31 where, first, motor 40 is reversed to convey the card in the reverse direction (step 601). The details of the reverse conveyance of the card are similar to those shown in FIG. 29. Namely, brake mechanism 45 is energized (step 401) to start the reversal of motor 40 (step 402). If a predetermined time (of 30 ms) has passed (step 404) and the rotation of motor 40 is stabilized, brake mechanism 45 is deenergized (step 405), and then clutch mechanism 44 is energized (step 406).

In FIG. 31, if the reversal conveyance of card MC is started (step 601), the timer is started (step 602), and sensor PSW1 is turned on before two seconds have passed (step 603). Thereafter, if sensor PSW3 is turned off (step 604), pulses output from encoder 101 are started to be counted (step 605). If the count has arrived at a predetermined value (step 606), the processings shown in FIG. 30 are performed to stop the card (step 607). If sensor PSW1 is not turned on even if two seconds has passed after the timer is started (step 608), the buzzer is caused to go by determining that there has occurred an abnormality such as card jamming to thereby perform N.G. processings such as emergent stop of motor 40 (step 609).

If it is confirmed that PSW4 has been turned on when sensor PSW2 is on at step 105 of FIG. 24 and it is determined that the length of the card is standard at step 108, it is determined whether sensor PSW1 is off (step 109). If so, shutter solenoid 100 is deenergized (step 110).

Thus, the card insertion slot is closed and then insertion of another card is rejected.

Subsequently, reading of recorded data on the card MC by magnetic sensor 8 is performed (step 111). This state is illustrated in FIG. 36. The magnetic sensor 8 includes a head which is capable of reading data on ten tracks, as mentioned above. Sensor 8 reads data on a coupon ticket card or a prepaid card from the two central tracks and data on a commutation ticket card from the remaining eight tracks. In the particular embodiment, data can be read from a coupon ticket card or a prepaid card only when same is inserted in the predetermined direction and cannot if the card is inserted in the opposite direction. In the later case, the card is returned. However, data can be read from a commutation ticket card even if same is inserted in any one of the normal and opposite directions. In the particular embodiment, it is determined whether the card is a coupon ticket one, a prepaid one or a commutation ticket in the reading process, it is then determined whether the coupon ticket card or prepaid card is valid or not, namely, whether it has a valid unexpired period, and it is determined whether the commutation ticket card is valid or not, namely, whether the commutation ticket card has a proper section and an unexpired period. If not, acceptance of the coupon ticket card, prepaid card or commutation ticket card is rejected and this fact is reported by appropriate reporting means such as a buzzer. Those determining step and reporting step are not shown.

The processing performed when the card is determined to be a coupon ticket card or a prepaid card differs from the process performed when the card is determined to be a commutaion ticket card. In the latter case, the data recorded on the commutaion ticket card is confirmed and the card is returned as it is by determining that the commutaion ticket card is valid.

However, in the former case, the record contents of the coupon ticket card or prepaid card corresponding to quantity of use are rewritten and the punching process to indicate the valid remaining value is performed.

The following flow concerns the processing performed when the inserted card is a coupon ticket card. When card MC is carried in the direction of arrow of FIG. 36 and the leading end of the card MC arrives at the position where sensor PSW6 is disposed, sensor PSW6 is turned on (FIG. 24) (step 112). Thus the processing of FIG. 30 is performed to stop motor 40 and hence the conveyance of card (step 113). Subsequently, by performing the processing of FIG. 29, the motor is reversed and the reverse conveyance of the card is started as shown in FIG. 37 (step 114).

In the course of the reverse conveyance, sensor PSW3 senses the presence and number of punched holes formed in card MC. The holes formed in card MC indicates the quantity of use (or valid remaining value) of card MC, so that an unused card has no punch holes. As the card is used, the number of punch holes increases sequentially.

If the processing at step 114 is terminated, it is checked whether sensor PSW3 is off (step 115). If so, it is determined that there is a punch hole and then it is checked how many times sensor PSW3 is turned on and off (step 116). Thus the number of punch holes already formed can be detected.

When the rear end of card MC arrives by the reverse conveyance of card MC at the position where sensor PSW1 is disposed, and sensor PSW1 is turned on (step 117), the processings of FIG. 30 are executed to stop the conveyance of card MC (step 118).

Figure 25:
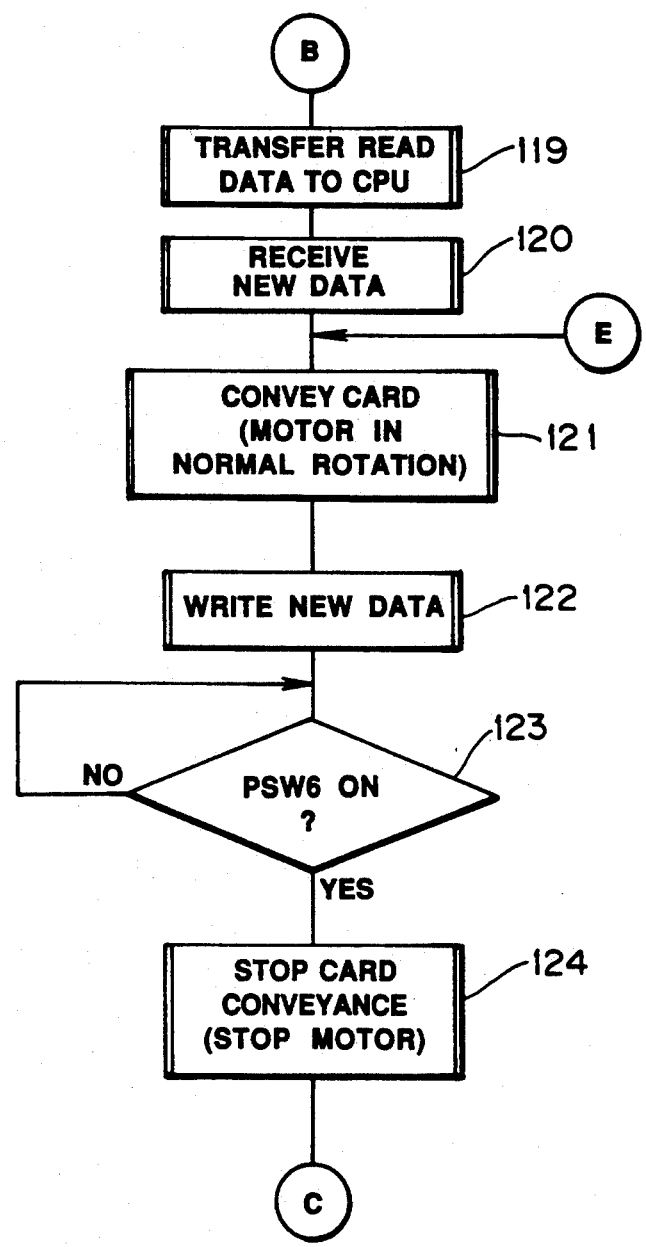

In FIG. 25, the data read by magnetic sensor 8 from card MC is transferred to main controller (CPU) 110 (step 119). Subsequently, new data to be written from main controller 110 into card MC is received (step 120). Thus, by executing the processing in FIG. 28, the card is started to be conveyed in the direction of arrow of FIG. 38 (step 121). In the course of this conveyance, the data on the card is rewritten with new data received at step 120. When card MC is conveyed to the position where magnetic sensor 8 is disposed, new data is written onto card MC (step 122). This writing is performed by driving magnetic sensor 8. As mentioned above, in the particular embodiment, the two central tracks are set for a coupon ticket, so that new data is written onto the two tracks.

Figure 39:
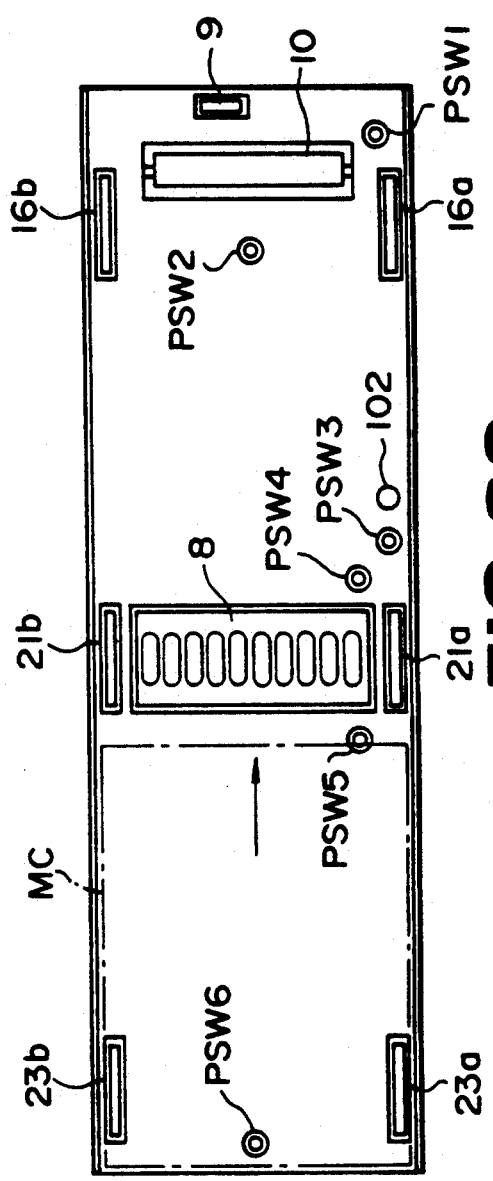
Figure 40:
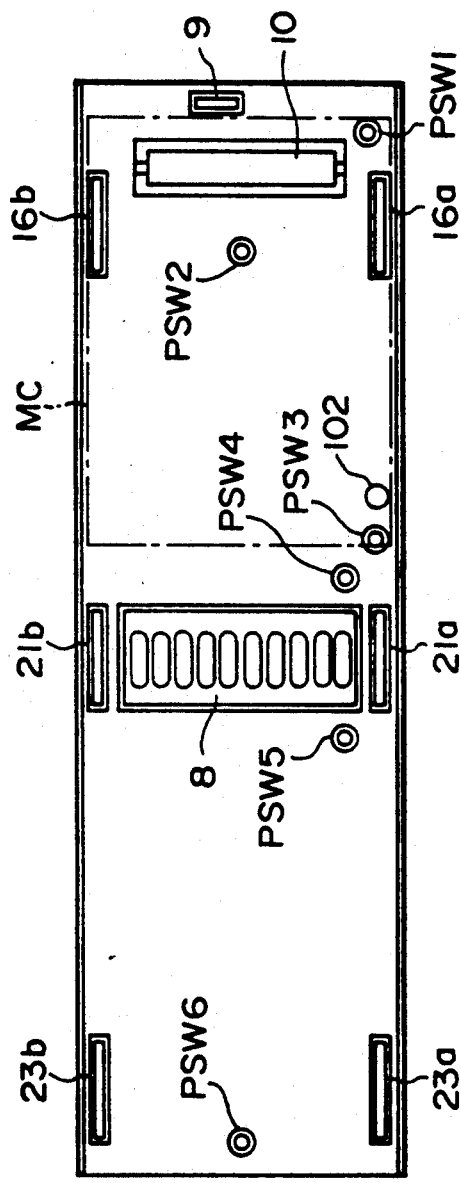
Figure 41:
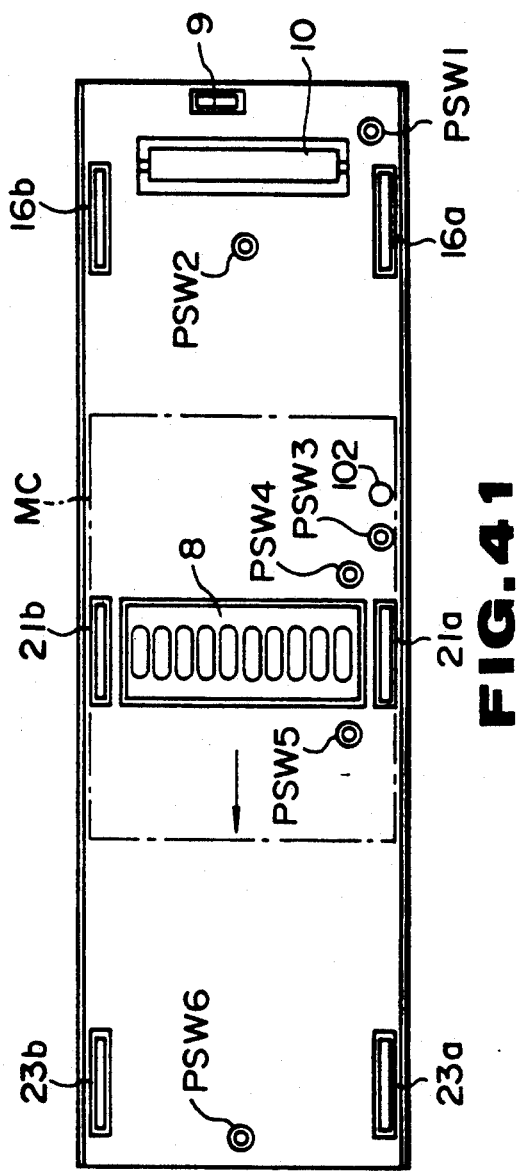
Figure 42:
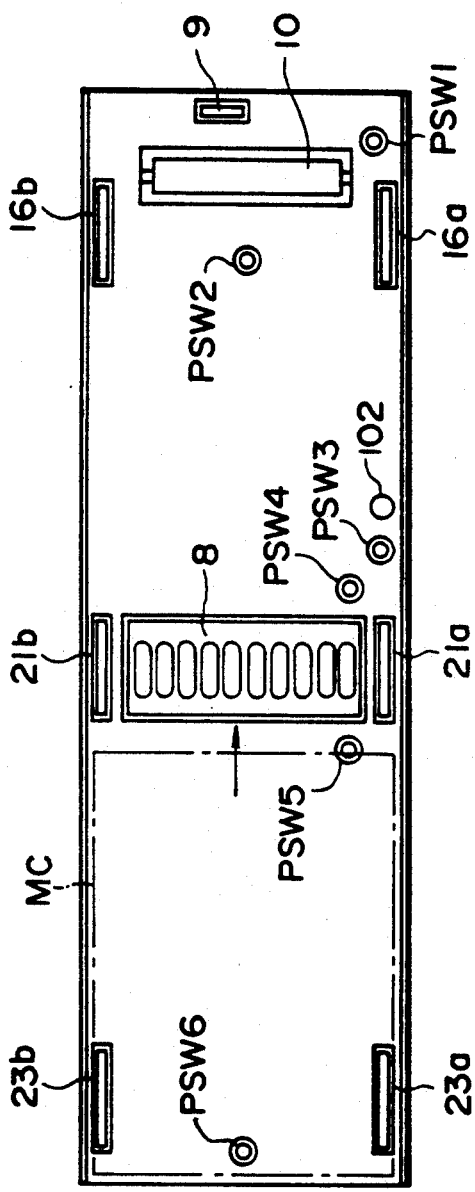
Figure 43:
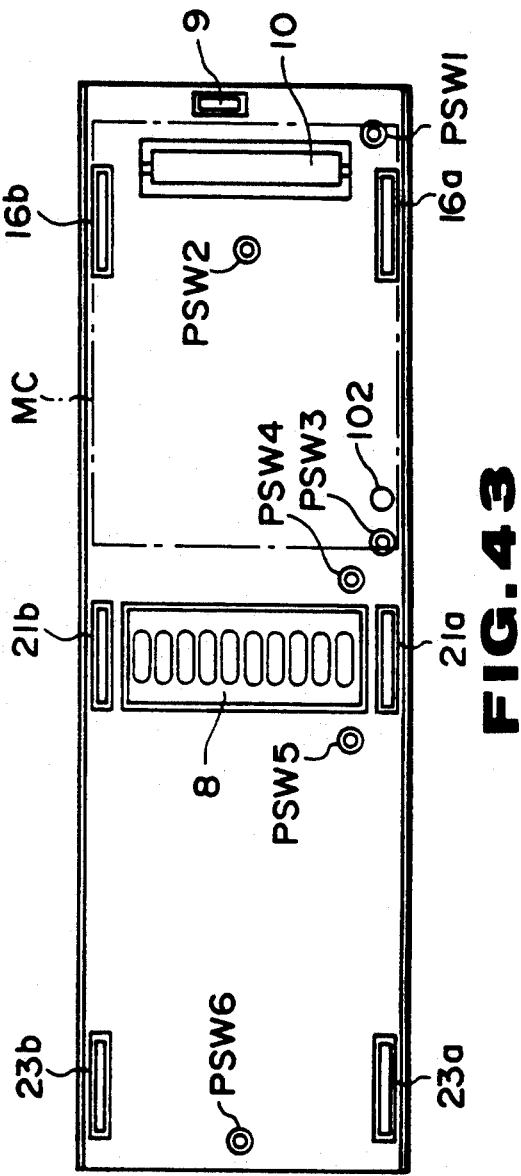
Figure 44:
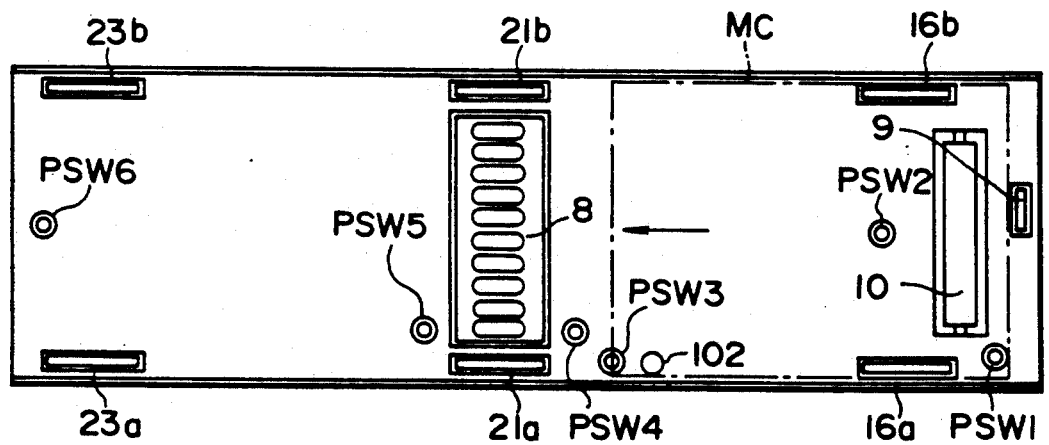

When the writing of new data is completed and sensor PSW6 is turned on (step 123), the processings of FIG. 30 are executed to thereby stop the conveyance of card MC (step 124), and the processings of FIG. 29 are again executed to convey card MC reversely in the direction of arrow of FIG. 39 (step 125). Subsequently, if sensor PSW1 is turned on (step 126) in FIG. 26, the processing of FIG. 30 is executed to stop card MC (FIG. 40), and the processing of FIG. 28 is again executed to thereby convey the card in the direction of arrow of FIG. 41 (step 128).

Figure 29:
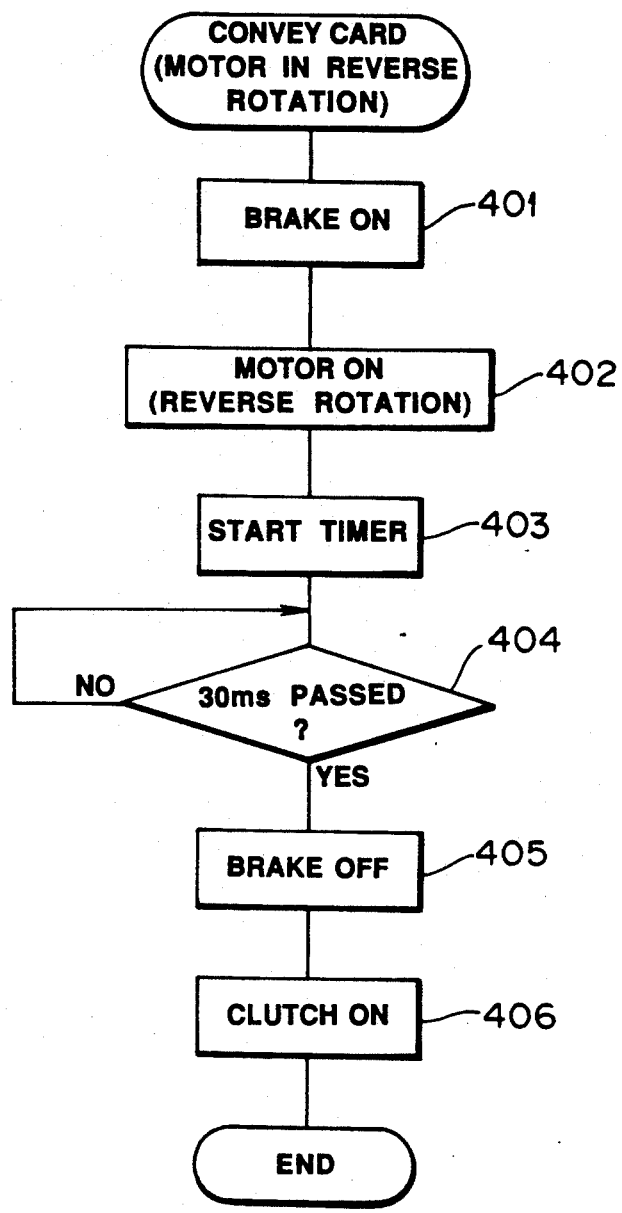

In the course of this conveyance (FIG. 41), the data written in card MC is again read in order to check whether the new data is written surely at the previous step 122 (step 129). If sensor PSW6 is turned on (step 130), the processing of FIG. 30 is executed to stop the card (step 131), and subsequently, the processing of FIG. 29 is executed to move the card in the direction of arrow of FIG. 42 (step 132). When the card arrives at the position shown in FIG. 43 to turn on sensor PSW1 (step 133), the processing of FIG. 30 is executed to stop the card (step 134).

Then, the data read at step 129 and the data written at step 122 are compared to determine whether both the data coincide (step 135). If so, the processing for forming a punch hole in card MC is performed (step 136).

Figure 28:
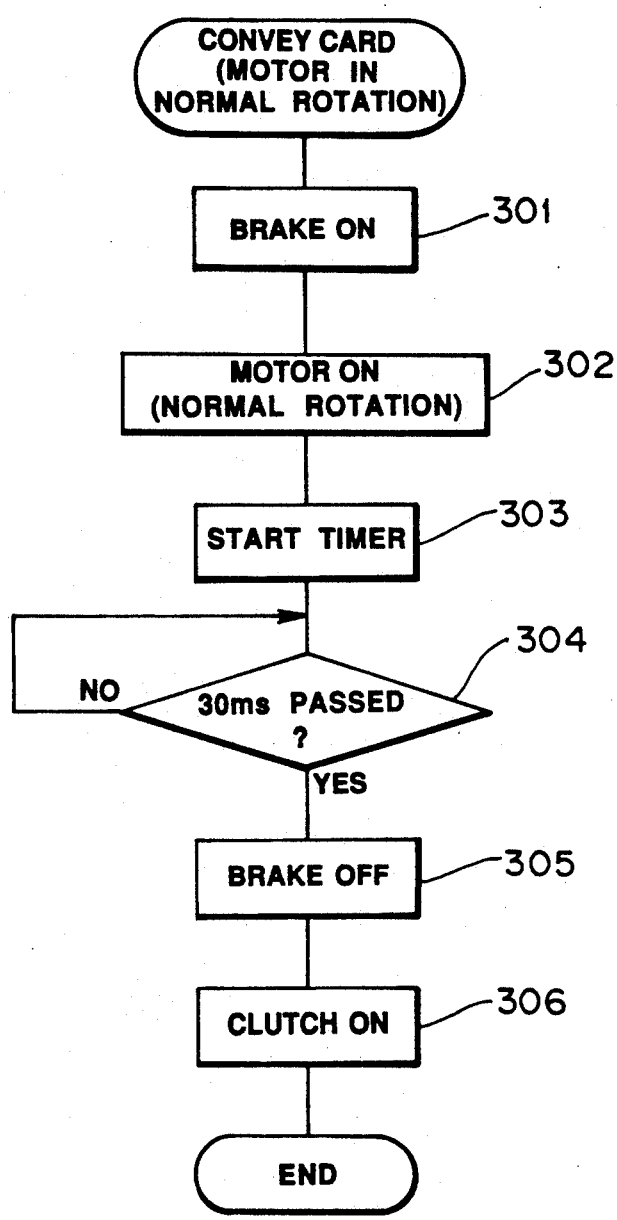
Figure 32:
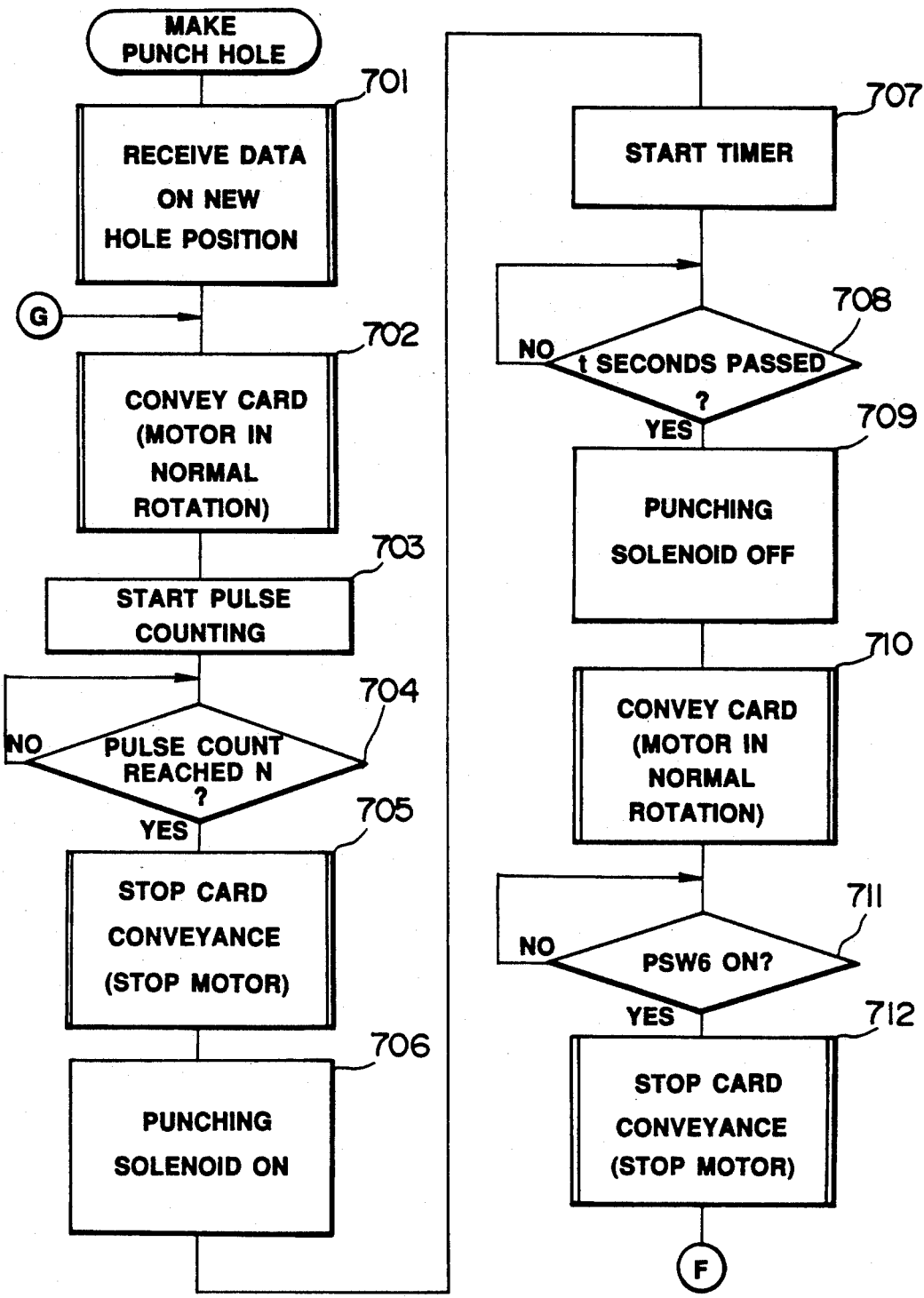
Figure 33:
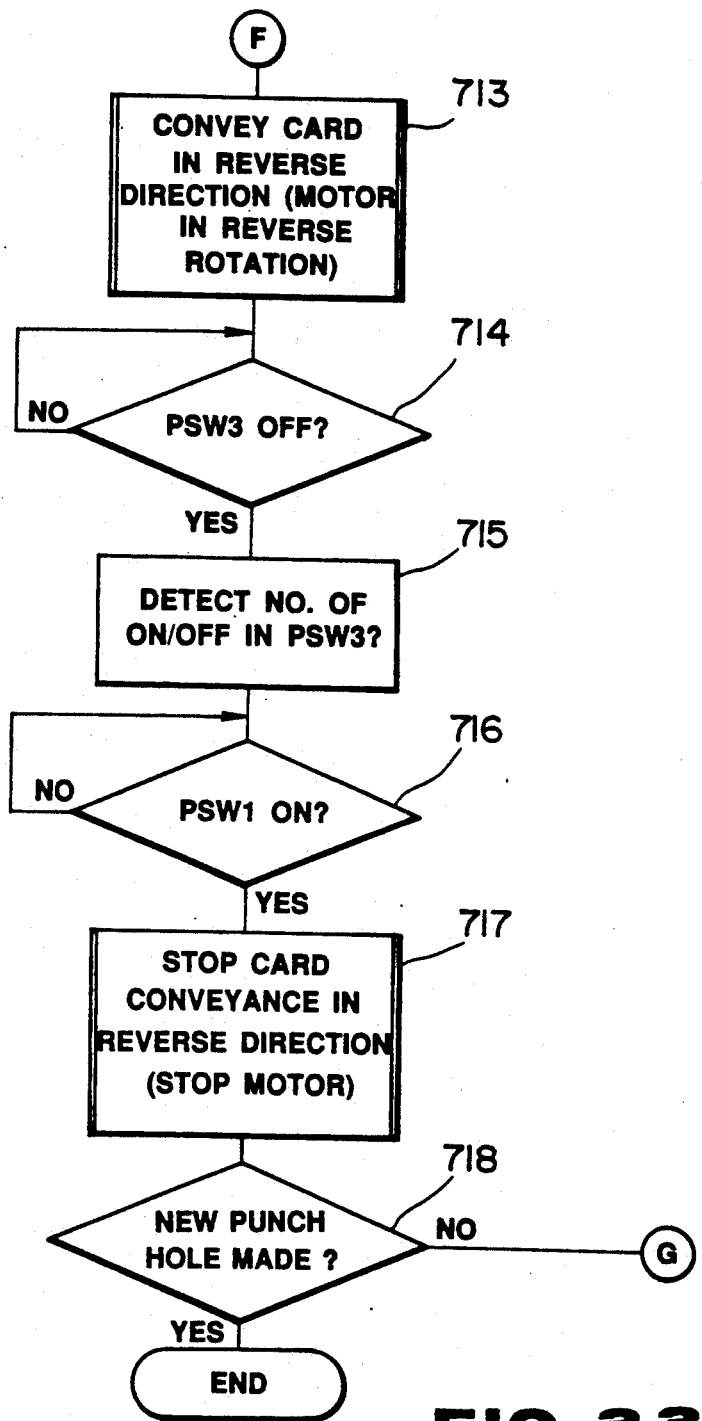
Figure 45A:
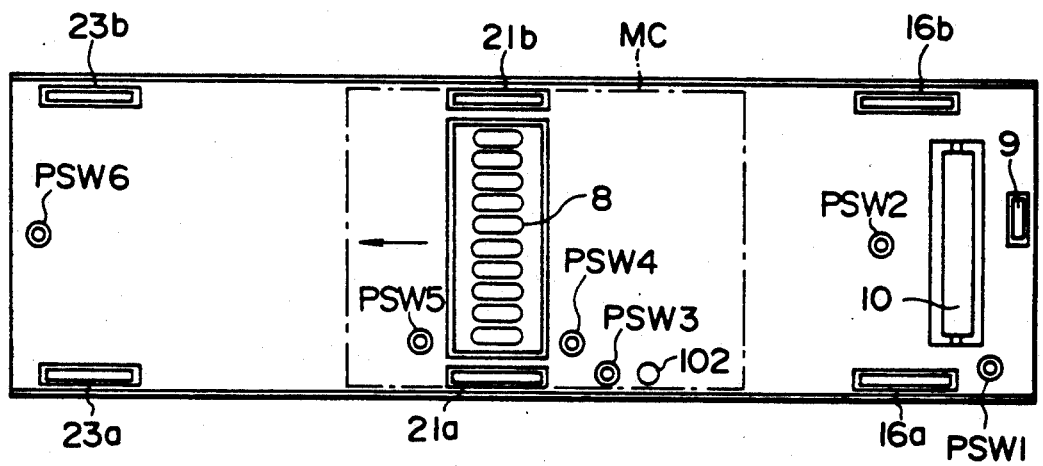
Figure 45B:
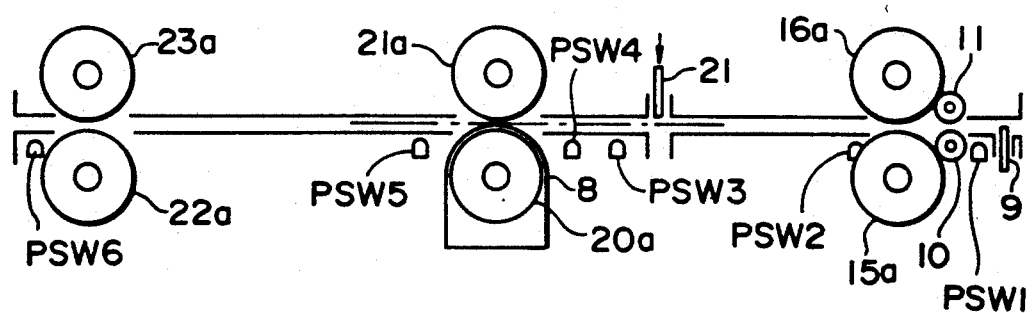

This punching operation is shown as a subroutine in FIGS. 32 and 33. In FIG. 32, data on the position where a new hole is made is received, from CPU 110 (step 701), the processing of FIG. 28 is first executed to convey the card in the direction of arrow of FIG. 44 (step 702). Subsequently, the pulses output from encoder 101 are started to be counted (step 703), and it is then determined whether the count has arrived at a predetermined value N (step 704). The predetermined value N, received from CPU 110, corresponds to the position on the card where the punch hole is to be formed. When the number of pulses output from encoder 101 arrives at the predetermined value N, the processing of FIG. 30 is executed to stop the conveyance of the card (step 705). Here, the punch solenoid 24 is energized (step 706) and punch plunger 21 is extended to form a punch hole in card MC. This situation is shown in FIGS. 45(a) and (b). When punch solenoid 24 is energized, the timer is started (step 707). If a predetermined time of t seconds has passed (step 708), punch solenoid 24 is deenergized (step 709) and the processing of FIG. 28 is executed to convey the card in the direction of arrow of FIG. 45(a) (step 710). If sensor PSW6 is turned on (step 711), the processing of FIG. 30 is executed to stop the card (step 712). Subsequently, the processing of FIG. 29 is executed to move the card in the direction of arrow of FIG. 46 (step 713). In the course of this conveyance, the punch hole formed by punch solenoid 24 is checked. First, it is checked whether sensor PSW3 is turned off (step 714). If so, it is determined that there is a punch hole, and it is then checked how many times sensor PSW3 has been turned on and off (step 715). Thus, the number of punch holes formed can be confirmed. After this, when card MC arrives at the position shown in FIG. 47 to thereby turn on sensor PSW1 (step 716), the processing of FIG. 30 is executed to stop the card (step 717). Subsequently, it is checked whether a new hole is formed, namely, the number of holes has increased by one (step 718). If so, this subroutine is terminated. However, it is determined that no new hole is formed, control returns to step 702 to perform punching again.

Figure 26:
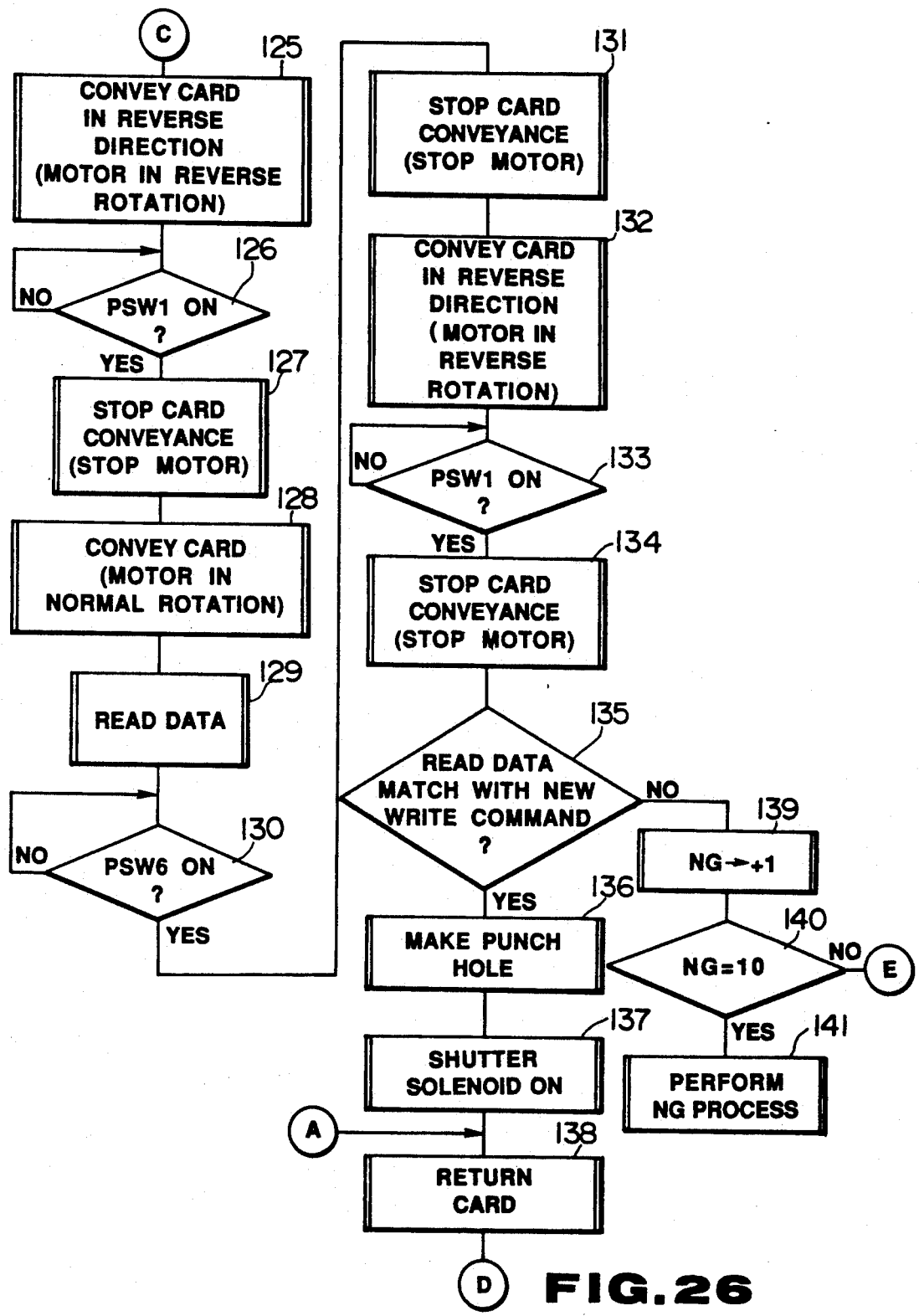
Figure 48:
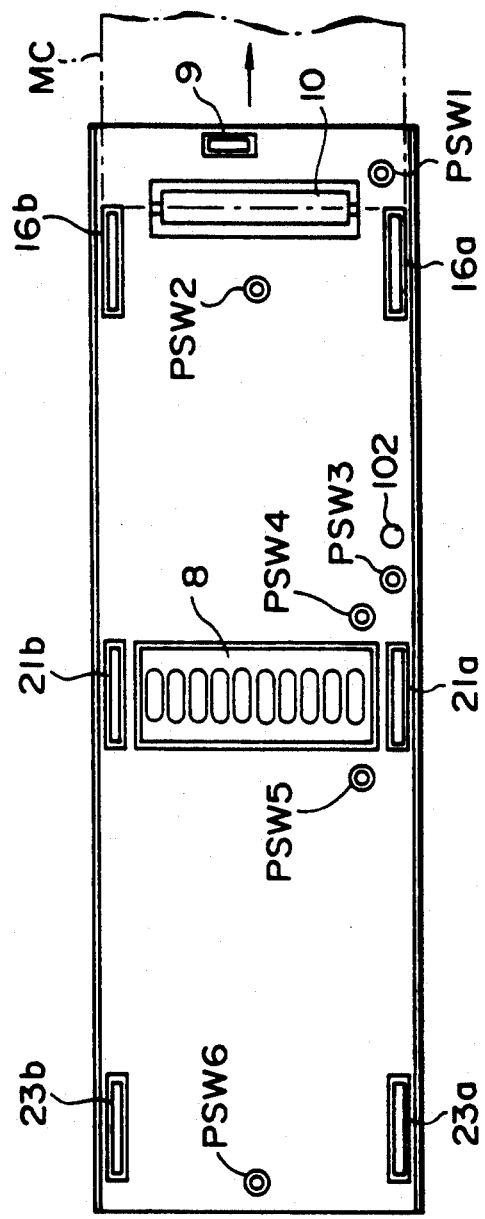

In FIG. 26, shutter solenoid 100 is then energized to open shutter 9 (step 137), and the processing of FIG. 31 is executed to return the card as shown in FIG. 48 (step 138). Thereafter, control returns to step 103 of FIG. 24 to bring about the standby state.

If the data read and the data written at step 135 do not coincide, it is determined that there was a failure in data writing at step 122, and the number of failures NG is set to one (step 139). Subsequently, it is checked whether the number of failures NG has arrived at n (for example, 10) (step 140). Since in this case the number of failures NG has not arrived at 10, control returns to step 121 to execute writing of data again. When the read data and the written data coincide at step 135 due to that writing, punching is executed, shutter 9 is opened and the card is returned (steps 136, 137 and 138). However, if the read data and the written data do not coincide even if writing of data is repeated n times at step 135, the number of failures NG becomes n (step 140). In this case, the motor is stopped and the predetermined NG processing which inhibits the return of the card is executed (step 141).

In the particular embodiment description has been made in the case of the card MC being a coupon ticket card. If the card MC is a commutation ticket card, arrangement should be such that after data is read at step 111, sensor PSW6 is turned on to stop the conveyance of the card and to reverse the direction of conveyance of the card, it is confirmed whether sensor PSW1 is on, the conveyance of card is stopped, and thereafter control passes to step 137.

While in the particular embodiment the card insertion slot and the card return outlet are described as being the same, the card return output may be provided on the opposite side of the card carrier from the card insertion slot. In this case, arrangement may be such that after the conveyance of the card is stopped at step 134, the return of card is executed in accordance with a card return command.

Alternatively, the return outlet for a commutation ticket card may differ from the return outlet for a coupon ticket card.

As described above, according to the present invention, the plurality of card conveyer means, each including a pair of an upper and a lower roller and a single motor are used. When the motor arrives at a rated rotational speed, the clutch mechanism and brake mechanism are actuated to transmit the power of the motor, and the card conveyer means is driven via the power transmission means comprising the timing pullies and timing belts. All the rollers of the card conveyer means are arranged to be instantaneously stopped by the brake mechanism. Therefore, the card can move at a predetermined speed through the card conveyer passageway, and stop securely at a predetermined dimensional position. Therefore, a punch hole is formed at an accurate position to visually transmit accurate magnetic recorded data to the user of the card.

The card conveyer means comprising the pair of upper and lower rollers does not move vertically, the upper and lower rollers of the pair transmit power separately to the card and both sides of the card are held by these rollers and carried. Therefore, during conveyance of the card, the contact of the card conveyer means with the magnetic recording face of the card is eliminated, and the upper and lower conveyance passageway members have recesses over which the card magnetic faces pass. Thus, the magnetic recording face of the card is prevented from being subjected to damage such as scratches or spots, so that a card reader is provided which performs reading and writing in a stabilized manner with high reliability.

The invention is not restricted to the embodiments illustrated and described and many changes and modifications could be made by those skilled in the art without departing from the scope of the attached claims.

What is claimed is:

1. A card carrier in a card reader in which a magnetic card having a magnetic recording surface on and around a center portion thereof is moved in a card conveyor passageway provided with a magnetic sensor for reading and writing data from and into the magnetic card, and the magnetic card is temporarily stopped in the card conveyor passageway to make a punch hole in the card, comprising:

card conveyor means including a plurality of driving roller units, each unit comprising an upper driving roller (6) and a lower driving roller (5) for holding therebetween only both sides of the magnetic card in the card conveyor passageway and for forcibly conveying the magnetic card along a longitudinal direction of the card conveyor passageway without contacting the magnetic recording surface, said roller units being disposed at a predetermined spacing along a longitudinal direction of the card conveyor passageway;

drive means including a single motor;

power transmission means including a plurality of timing pulleys and a plurality of timing belts for simultaneously transmitting a driving force of the motor to all of the driving rollers;

a clutch mechanism disposed between the power transmission means and the motor for transmitting the drive force of the motor to the power transmission means when the motor arrives at a predetermined rated rotational speed; and power interrupting means including a brake mechanism for stopping the operation of the power transmission means instaneously.

2. A card carrier according to claim 1, including inter-shaft distance adjusting means disposed on at least one of roller shafts supporting each pair of rollers of the card conveyor means, the inter-shaft distance adjusting means including a support for supporting the at least one roller shaft, a slider disposed relative to the support such that the slider can slide toward the other roller shaft, an inter-shaft distance adjusting screw supported at an end rotatable and unremovably in the slider and screwed into the support, and a spring disposed between the slider and the support for forcing the slider normally toward the other roller shaft.

3. A card carrier according to claim 1, wherein the rollers of each pair in the card conveyor means are spaced by about half the thickness of a usable magnetic card.

4. A card carrier according to claim 1, wherein each pair of rollers in the card conveyor means is made of an elastic material, and an upper one of the rollers of that pair is made of at least an elastic material softer than the material constituting a lower roller.

5. A card carrier according to claim 1, wherein an upper one of the rollers of each pair in the card conveyor means is made of soft silicone rubber and a lower roller is made of rigid silicone rubber.

6. A card carrier according to claim 1, wherein the power transmission means rotates rollers of each pair in the card conveyor means in the opposite directions.

7. A card carrier according to claim 1, wherein the clutch mechanism includes an electromagnetic clutch.

8. A card carrier according to claim 1, wherein the brake mechanism includes an electromagnetic brake.

9. A card carrier in a card reader in which a magnetic card is moved in a card conveyor passageway in which a magnetic sensor is disposed to read and write data from and into the magnetic card, and the magnetic card is temporarily stopped in the card conveyor passageway to make a punch hole in the card, comprising;
　a pressure roller of an elastic material disposed at a position opposite to the magnetic sensor with a predetermined spacing such that the pressure roller is rotated in the same direction as the magnetic card is conveyed;
　card conveyer means including a plurality of driving roller units, each unit comprising an upper driving roller and a lower driving roller for holding therebetween only both sides of the magnetic card in the card conveyor passageway and for forcibly conveying the magnetic card along a longitudinal direction of the card convener passageway without contacting the magnetic recording surface, said roller units being disposed at a predetermined spacing along a longitudinal direction of the card conveyor passageway;
　driving means including a single motor;
　power transmission means including a plurality of timing pulleys and a plurality of timing belts for simultaneously transmitting a driving force of the motor to all of the driving rollers;
　a clutch mechanism disposed between the power transmission means and the motor for transmitting the drive force of the motor to the power transmission means when the motor arrives at a predetermined rotated rotational speed; and
　power interrupting means including a brake mechanism for stopping the operation of the power transmission means instantaneously.

10. A card carrier according to claim 9, wherein the pressure roller is spaced by about half the thickness of a usable magnetic card from the magnetic sensor.

11. A card carrier according to claim 9, wherein he pressure roller is made of a very soft elastic material.

12. A card carrier according to claim 9, wherein the pressure roller is made of soft silicone rubber.

13. A card carrier according to claim 9, wherein the pressure roller is prevented from moving vertically relative to the magnetic sensor.

14. A card carrier in a card reader in which a magnetic card is moved in a card conveyer passageway in which a magnetic sensor is disposed to read and write data from and into the magnetic card, and the magnetic card is temporarily stopped in the card conveyor passageway to make a punch hole in the card, comprising:
　a pressure roller of an elastic material disposed at a position opposite to the magnetic sensor with a predetermined spacing such that the pressure roller is rotated in the same direction as the magnetic card is conveyed;
　a cam for supporting a bottom of the magnetic sensor such that the spacing between the magnetic sensor and the pressure roller is adjusted by moving the magnetic sensor vertically in accordance with a deviation of the cam;
　card conveyor means including a plurality of driving roller units, each unit comprising an upper driving roller and a lower driving roller for holding therebetween only both sides of the magnetic card in the card conveyor passageway and for forcibly conveying the magnetic card along a longitudinal direction of the card conveyer passageway without contacting the magnetic recording surface, said roller units being disposed at a predetermined spacing along a longitudinal direction of the card conveyor passageway;
　driving means including a single motor;
　power transmission means including a plurality of timing pulleys and a plurality of timing belts for simultaneously transmitting a driving force of the motor to all of the driving rollers;
　a clutch mechanism disposed between the power transmission means and the motor for transmitting the drive force of the motor to the power transmission means when the motor arrives at a predetermined rated rotational speed; and
　power interrupting means including a brake mechanism for stopping the operation of the power transmission means instantaneously.

15. A card carrier according to claim 14, wherein the pressure roller is made of a very soft elastic material.

16. A card carrier according to claim 14, wherein the pressure roller is made of soft silicone rubber.

17. A card carrier according to claim 14, wherein the pressure roller is prevented from moving vertically relative to the magnetic sensor.

18. A card carrier in a card reader in which a magnetic card having a magnetic recording surface on and around a center portion thereof is moved in a plate-like card conveyor passageway provided with a magnetic sensor for reading and writing data from and into the magnetic card, and the magnetic card is temporarily stopped in the plate-like card conveyor passageway to make a punch hole in the card, comprising;
　a recess formed in the plate-like card conveyor passageway at a position opposite to a write/read head formed in the magnetic sensor and extending along a longitudinal direction of the plate-like card conveyor passageway;
　card conveyor means including a plurality of driving roller units, each unit comprising an upper driving roller (6) and a lower driving roller (5) for holding therebetween only both sides of the magnetic card in the card conveyor passageway and for forcibly conveying the magnetic card along a longitudinal direction of the card conveyor passageway without contacting the magnetic recording surface, sad roller units being disposed at a predetermined spacing along a longitudinal direction of the card conveyor passageway;

drive mean including a single motor;

power transmission means including a plurality of timing pulleys and a plurality of timing belts for simultaneously transmitting a driving force of the motor to all of the driving rollers;

a clutch mechanism disposed between the power transmission means and the motor for transmitting the drive force of the motor to the power transmission mean when the motor arrives at a predetermined rated rotational speed; and power interrupting means including a brake mechanism for stopping the operation of the power transmission means instaneously.

19. A card carrier in a card reader in which a magnetic card having a magnetic recording surface on and around a center portion thereof is moved in a plate-like card conveyor passageway provided with a magnetic sensor for reading and writing data from and into the magnetic card, and the magnetic card is temporarily stopped in the plate-like card conveyor passageway to make a punch hole in the card, comprising:

a pair of rollers disposed at a card insertion slot in the plate-like card conveyor passageway, the rollers of the pairs being made of a rigid material, and a spacing between opposing peripheral surfaces of the rollers being substantially equal to a thickness of a usable magnetic card;

a recess formed in the plate-like card conveyor passageway at a position opposite to a write/read head formed in the magnetic sensor and extending along a longitudinal direction of the plate-like card conveyor passageway;

card conveyor means including a plurality of driving roller units, each unit comprising an upper driving roller (6) and a lower driving roller (5) for holding therebetween only both sides of the magnetic card in the card conveyor passageway and for forcibly conveying the magnetic card along a longitudinal direction of the card conveyor passageway without contacting the magnetic recording surface, said roller units being disposed at a predetermined spacing along a longitudinal direction of the card conveyor passageway;

drive means including a single motor;

power transmission means including a plurality of timing pulleys and a plurality of timing belts for simultaneously transmitting a driving force of the motor to all of the driving rollers;

a clutch mechanism disposed between the power transmission means and the motor for transmitting the drive force of the motor to the power transmission means when the motor arrives at a predetermined rated rotational speed; and power interrupting means including a brake mechanism for stopping the operation of the power transmission means instaneously.

* * * * *